(12) United States Patent
Kiyama

(10) Patent No.: US 12,368,214 B2
(45) Date of Patent: Jul. 22, 2025

(54) POROUS BODY, SEPARATOR FOR LEAD ACID STORAGE BATTERIES, AND LEAD ACID STORAGE BATTERY

(71) Applicant: Asahi Kasei Kabushiki Kaisha, Tokyo (JP)

(72) Inventor: Tomonori Kiyama, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/981,747

(22) PCT Filed: Mar. 26, 2019

(86) PCT No.: PCT/JP2019/012965
§ 371 (c)(1),
(2) Date: Sep. 17, 2020

(87) PCT Pub. No.: WO2019/198500
PCT Pub. Date: Oct. 17, 2019

(65) Prior Publication Data
US 2021/0036290 A1    Feb. 4, 2021

(30) Foreign Application Priority Data

Apr. 9, 2018 (JP) .................. 2018-074651
Sep. 25, 2018 (JP) .................. 2018-179019

(51) Int. Cl.
| H01M 50/446 | (2021.01) |
| H01M 4/02 | (2006.01) |
| H01M 4/14 | (2006.01) |
| H01M 4/56 | (2006.01) |
| H01M 4/62 | (2006.01) |
| H01M 50/409 | (2021.01) |
| H01M 50/443 | (2021.01) |
| H01M 50/46 | (2021.01) |

(52) U.S. Cl.
CPC ........... *H01M 50/446* (2021.01); *H01M 4/14* (2013.01); *H01M 4/56* (2013.01); *H01M 4/622* (2013.01); *H01M 50/409* (2021.01); *H01M 50/443* (2021.01); *H01M 50/46* (2021.01); *H01M 2004/027* (2013.01); *H01M 2004/028* (2013.01)

(58) Field of Classification Search
CPC ...... H01M 50/446; H01M 50/46; H01M 4/14; H01M 4/56; H01M 4/622; H01M 2004/027; H01M 2004/028
See application file for complete search history.

(56) References Cited

U.S. PATENT DOCUMENTS

| 6,120,939 A | 9/2000 | Whear et al. |
| 2002/0076615 A1 | 6/2002 | Tanaka et al. |
| 2004/0242794 A1 | 12/2004 | Kanazawa |
| 2013/0101887 A1 | 4/2013 | Sugiyama et al. |
| 2016/0315327 A1* | 10/2016 | Ketzer ................. H01M 10/14 |
| 2017/0077475 A1* | 3/2017 | Omaru ................. H01M 50/44 |
| 2017/0179454 A1 | 6/2017 | Natesh et al. |
| 2018/0047964 A1* | 2/2018 | Natesh ................. B32B 27/12 |
| 2018/0159106 A1* | 6/2018 | McVerry ............... H01M 4/583 |
| 2019/0051878 A1* | 2/2019 | Kusakabe ........... H01M 50/489 |
| 2020/0035974 A1* | 1/2020 | Miller ................. H01M 10/06 |

FOREIGN PATENT DOCUMENTS

| CN | 1399359 A | 2/2003 | |
| CN | 102884654 A | 1/2013 | |
| CN | 102986060 A * | 3/2013 | ......... H01M 40/411 |
| EP | 0466302 A1 | 1/1992 | |
| EP | 0975032 A1 | 1/2000 | |
| JP | 862-180954 A | 8/1987 | |
| JP | H04-229950 A | 8/1992 | |
| JP | H05-054874 A | 3/1993 | |
| JP | H11-250889 A | 9/1999 | |
| JP | 2002-203532 A | 7/2002 | |
| JP | 2002-289165 A | 10/2002 | |
| JP | 2003-059478 A | 2/2003 | |
| JP | 2003268662 A * | 9/2003 | ......... H01M 40/411 |
| JP | 2003-297328 A | 10/2003 | |
| JP | 2006-310274 A | 11/2006 | |
| JP | 4066487 B2 | 3/2008 | |
| JP | 2012-216363 A | 11/2012 | |
| JP | 2015-060686 A | 3/2015 | |
| JP | 2016-024970 A | 2/2016 | |
| JP | WO2016/052512 A1 | 4/2017 | |

(Continued)

OTHER PUBLICATIONS

English Machine Translation of Kawachi et al. (JP 2006310274 A) (provided in Information Disclosure Statement filed by Applicant on Oct. 27, 2020) (Year: 2006).*
English Machine Translation of Oyama et al. (JP 2015060686 A) (provided in Information Disclosure Statement filed by Applicant on Oct. 27, 2020) (Year: 2015).*
Machine Translation of Oyama (Year: 2015).*
International Search Report issued in corresponding International Patent Application No. PCT/JP2019/012965 dated Jun. 4, 2019.
International Preliminary Report on Patentability and Written Opinion issued in corresponding International Patent Application No. PCT/JP2019/012965 dated Oct. 22, 2020.
Supplementary European Search Report issued in corresponding European Patent Application No. 19784460.8 dated May 26, 2021.

*Primary Examiner* — Matthew T Martin
*Assistant Examiner* — Ankith R Sripathi
(74) *Attorney, Agent, or Firm* — Morgan, Lewis & Bockius LLP

(57) ABSTRACT

The present invention provides a porous body which contains sheath-core type binder fibers and a resin binder, and which is characterized in that: the resin binder (the solid content) is contained in an amount of more than 5.0 parts by mass but less than 50 parts by mass relative to 100 parts by mass of the porous body; and if P (N) is the penetration strength of the porous body and B (g/m²) is the weight per square meter of the porous body, P and B satisfy P/B>0.070.

16 Claims, No Drawings

(56) References Cited

FOREIGN PATENT DOCUMENTS

| KR | 20170116611 A | * 10/2017 | .......... H01M 40/411 |
|----|---------------|-----------|------------------------|
| WO | 2013/191791 A1 | 12/2013 | |

* cited by examiner

POROUS BODY, SEPARATOR FOR LEAD ACID STORAGE BATTERIES, AND LEAD ACID STORAGE BATTERY

FIELD

The present invention relates to a porous body, a separator, a separator for lead acid storage batteries, and a lead acid storage battery using these.

BACKGROUND

Porous bodies can be used as battery separators, adsorbents, carriers, filters, etc., due to porosity thereof. Among these, lead acid storage batteries are widely utilized worldwide for in-vehicle applications (for example, passenger cars, buses, trucks, two-wheeled vehicles, and golf carts) or industrial applications (for example, forklifts, tillage machines, railways, UPS, and communication devices), etc. For in-vehicle use, the lead acid storage battery is placed in an elevated temperature environment inside the vehicle depending on the region and/or season, so that the battery members (for example, separators, etc.) are required for exhibiting high thermal resistance in dilute sulfuric acid, which is an electrolytic solution.

A nonwoven fabric of glass fibers called AGM (Absorbed Glass Mat) has been widely known as a separator for lead acid storage batteries. Such a separator has high ability to inhibit stratification (which is referred to as formation of a region having a high concentration of dilute sulfuric acid that is an electrolytic solution and a region having a low concentration thereof in an electrolytic cell) that can occur due to charge and discharge of the lead acid storage battery.

Moreover, a separator for lead acid storage batteries in which glass fibers, organic fibers, and inorganic particles are composited by using a coagulant in a papermaking process, has also been reported (for example, PTL 1). Such a composite separator has an advantage of contributing to reinforcement of the membrane strength by the organic fibers and cost reduction by replacing a portion of the expensive glass fibers with the inexpensive organic fibers. Further, by incorporating the inorganic particles in the voids between the fibers, it is possible to densify the separator for reducing a fine pore size, which is advantageous for inhibiting a short circuit due to dendrites generated from the electrodes, or a short circuit due to active materials that fell off from the electrodes.

CITATION LIST

Patent Literature

[PTL 1] Japanese Unexamined Patent Publication No. 2006-310274

SUMMARY

Technical Problem

However, regarding the separator for lead acid storage batteries in which a plurality of materials described above are composited, the material design in consideration of the binding property between various members becomes complicated, so that thermal resistance of the separator (for example, weight retainability, shape retainability, etc.) in the dilute sulfuric acid that is an electrolytic solution ought to be improved.

The present invention has been devised in light of the circumstances described above, and an object of the present invention is to provide a porous body in which a plurality of components contained are composited, exhibiting high thermal resistance, and a filter or a separator using the same.

Solution to Problem

The above issues can be solved by the following technological means.

[1]

A porous body containing sheath-core type binder fibers and a resin binder, wherein a resin binder solid content is contained in an amount of more than 5.0 parts by weight and less than 50 parts by weight relative to 100 parts by weight of the porous body, and when P (N) is a penetration strength of the porous body and B (g/m$^2$) is a basis weight of the porous body, P and B satisfy P/B>0.070.

[2]

The porous body according to [1], wherein the porous body is a separator.

[3]

The porous body according to [1], wherein the porous body is a separator for lead acid storage batteries.

[4]

The porous body according to any one of [1] to [3], wherein a melting component of the sheath-core type binder fibers is contained in an amount of 5.0 parts by weight or more of relative to 100 parts by weight of the porous body.

[5]

The porous body according to any one of [1] to [4], which a melting component of the sheath-core type binder fibers is contained in an amount of 5.0 parts by weight or more and 50 parts by weight or less relative to 100 parts by weight of the porous body.

[6]

The porous body according to any one of [1] to [5], wherein a melting component of the sheath-core type binder fiber has a melting point of 220° C. or lower.

[7]

The porous body according to any one of [1] to [6], wherein a melting component of the sheath-core type binder fiber has a melting point of lower than 200° C.

[8]

The porous body according to any one of [1] to [7], wherein the porous body contains inorganic fibers.

[9]

The porous body according to any one of [1] to [8], wherein the porous body contains glass fibers.

[10]

The porous body according to any one of [1] to [9], wherein the porous body contains particles.

The porous body according to any one of [1] to [10], wherein the porous body contains inorganic particles.

[12]

The porous body according to any one of [1] to [11], wherein the porous body contains particles and inorganic fibers and when a weight of the particles contained in the porous body is Wp (g), a weight of the inorganic fibers is Wf (g), and a weight of the resin binder solid content is Wb (g), Wp, Wf, and Wb satisfy (Wp+Wf)/Wb<7.0.

[13]

The porous body according to any one of [1] to [12], wherein the porous body contains inorganic particles and glass fibers and when a weight of the inorganic particles contained in the porous body is Wi (g), a weight of the glass fibers is Wg (g), and a weight of the resin binder solid content is Wb (g), Wi, Wg, and Wb satisfy (Wi+Wg)/Wb<7.0.

[14]

The porous body according to any one of [1] to [13], wherein an amount of a melting component having a melting point of lower than 200° C. in the sheath-core type binder fibers contained in 100 parts by weight of the porous body, ranges from 5.0 parts by weight to 50 parts by weight, the porous body contains inorganic particles and glass fibers, and when a weight of the inorganic particles contained in the porous body is Wi (g), a weight of the glass fibers is Wg (g), and a weight of the resin binder solid content is Wb (g), Wi, Wg, and Wb satisfy (Wi+Wg)/Wb<7.0.

[15]

The porous body according to [14], wherein the porous body is a separator for lead acid storage batteries.

[16]

The porous body according to any one of [1] to [15], wherein the sheath-core type binder fibers are contained in an amount of 10 parts by weight or more and 80 parts by weight or less relative to 100 parts by weight of the porous body.

[17]

The porous body according to any one of [1] to [16], wherein a melting component of the sheath-core type binder fiber is polyester having a melting point of lower than 200° C.

[18]

The porous body according to any one of [1] to [17], wherein a weight ratio of a sheath component to a core component of the sheath-core type binder fiber (a weight of the sheath component (g)/a weight of the core component (g)) is 0.15 or more and 50 or less.

[19]

The porous body according to any one of [1] to [18], wherein a weight ratio of a sheath component to a core component of the sheath-core type binder fiber (a weight of the sheath component (g)/a weight of the core component (g)) is 0.60 or more and 1.6 or less.

[20]

The porous body according to any one of [1] to [19], wherein the P/B satisfies P/B<0.350.

[21]

The porous body according to [12], wherein the (Wp+Wf)/Wb satisfies (Wp+Wf)/Wb>0.6.

[22]

The porous body according to [13] or [14], wherein the (Wi+Wg)/Wb satisfies (Wi+Wg)/Wb>0.6.

[23]

The porous body according to any one of [1] to [22], wherein the porous body contains particles and a particle diameter of the particle is 0.01 μm or larger and 200 μm or smaller.

[24]

The porous body according to any one of [1] to [23], wherein the porous body contains particles and an average particle diameter of the particle is 0.5 μm or larger and 100 μm or smaller.

[25]

The porous body according to any one of [1] to [24], wherein a density of at least one portion of the porous body is 145 g/m$^2$/mm or more.

[26]

The porous body according to any one of [1] to [25], wherein the porous body contains particles and the particles are silica particles.

[27]

The porous body according to any one of [1] to [26], wherein the resin binder is an acrylic-based binder, and/or a styrene-based resin binder.

[28]

The porous body according to any one of [1] to [27], wherein a non-melting component of the sheath-core type binder fiber is polyester having a melting point of 200° C. or higher.

[29]

The porous body according to any one of [1] to [28], wherein the porous body contains organic fibers having a melting point of 200° C. or higher, excluding the sheath-core type binder fibers.

[30]

The porous body according to any one of [1] to [29], wherein the porous body contains particles and inorganic fibers, and a sum of a weight of the particles and a weight of the inorganic fibers is 5 parts by weight to 80 parts by weight, relative to 100 parts by weight of the porous body.

[31]

The porous body according to any one of [1] to [30], wherein the porous body contains inorganic fibers, and the inorganic fibers are contained in an amount of 3 parts by weight to 70 parts by weight relative to 100 parts by weight of the porous body.

[32]

The porous body according to any one of [1] to [31], wherein the porous body contains particles, and the particles are contained in an amount of 3 parts by weight to 70 parts by weight relative to 100 parts by weight of the porous body.

[33]

The porous body according to any one of [1] to [32], wherein the porous body is a wet papermaking porous body.

[34]

A lead acid storage battery containing an electrolytic cell, a lead oxide positive electrode, a lead negative electrode, and dilute sulfuric acid, wherein the porous body according to any one of [1] to [33] is disposed between the lead oxide positive electrode and the lead negative electrode.

Advantageous Effects of Invention

According to the invention, a separator for lead acid storage batteries in which a plurality of components contained constituting a porous body are composited, that enables to improve thermal resistance of the porous body and also exhibits high weight retainability as well as shape retainability in dilute sulfuric acid that is an electrolytic solution of a lead acid storage battery, can be provided.

DESCRIPTION OF EMBODIMENTS

Embodiments of the present invention (hereunder often referred to as "the present embodiment") will now be explained in detail below. Incidentally, it is to be understood, however, that the invention is not limited to the embodiments below and can be modified within the scope of the gist thereof <<Porous Body>>

The porous body according to the present embodiment contains sheath-core type binder fibers and a resin binder and satisfies the relation represented by the following formula:

$$P/B > 0.070$$

wherein P denotes a penetration strength (N) of the porous body and B a basis weight (g/m$^2$) of the porous body, and the amount of the resin binder solid content is more than 5.0 parts by weight and less than 50 parts by weight relative to 100 parts by weight of the porous body. If desired, the porous body may contain components such as inorganic fibers, organic fibers (excluding sheath-core type binder fibers), particles, etc., in addition to the sheath-core type binder fibers and the resin binder. The porous body according to the present embodiment is a porous membrane having a membrane form such as a film, sheet, nonwoven fabric, woven fabric, etc. It is noted that the membrane thickness of the porous membrane is not particularly limited. The porous body is used as a separator for separating a plurality of parts, a battery separator (for example, a separator for lead acid storage batteries), a filter, an adsorbent, a carrier, etc., depending on form, porosity, permeability and strength thereof. Above all, by using the porous body according to the present embodiment as a separator for lead acid storage batteries using dilute sulfuric acid as an electrolytic solution, high thermal resistance in dilute sulfuric acid (weight retainability and shape retainability) can be obtained. Hereinafter, the content regarding the present invention will be subdivided and explained in detail. Throughout the present description, when describing parts by weight of various members, the expression A to B parts by weight is used, which refers to A parts by weight or more and B parts by weight or less. Moreover, for convenience of description, the unit of weight is represented by g, and is compatible with mass (g) in the present description.

<<Particle>>

From the viewpoint of enabling formation of fine pores by compositing the particles with the porous body according to the present embodiment, and/or from the standpoint that when the porous body is used as a separator inside lead acid storage batteries, a dendrite short or a short circuit due to an active material that enters the separator is inhibited by holding the particles in the void portions between a plurality of fibers to reduce the pore size of the porous body, the porous body according to the present embodiment preferably contains particles. From this point of view, any of inorganic particles, organic particles, and organic-inorganic composite particles can be used as particles without any particular limitation. Since the organic particles and the organic-inorganic composite particles generally have a lower density as compared with the inorganic particles, the particles are preferably inorganic particles that hardly scatter in space when handling the powder.

When using organic particles and organic-inorganic composite particles, it is possible to form pores in the porous body by compositing these while retaining the particle shape in the porous body during the production of the porous body (particularly in the heating step). From the viewpoint of retaining the particle shape in the porous body, the melting point of the organic component contained in the organic particles and the organic-inorganic composite particles is preferably higher than the melting point of the sheath of the sheath-core type binder fiber described below. From this viewpoint, the melting points of the organic components contained in the organic particles and the organic-inorganic composite particles are preferably 5° C. or higher, more preferably 10° C. or higher, still more preferably 20° C. or higher, and even still more preferably 100° C. or higher than the melting point of the sheath of the sheath-core type binder fiber.

Materials for the inorganic particles, for example, include silica (precipitated silica, silica gel, fumed silica, etc.), alumina, sulfates (for example, barium sulfate, calcium sulfate), titania (rutile type, anatase type), gibbsite, bayerite, boehmite, zirconia, magnesia, ceria, yttria, oxide ceramics such as zinc oxide, iron oxide, etc.; nitride-based ceramics such as silicon nitride, titanium nitride, boron nitride, etc.; silicon carbide, calcium carbonate, aluminum sulfate, aluminum hydroxide, magnesium hydroxide, potassium titanate, talc, synthetic kaolinite, kaolin clay, kaolin (kaolinite, Dickite (Dck) stone, Nacrite stone), calcined kaolin, fraipontite, stevensite, dickite, nacrite, Halloysite, pyrophyllite, odnightite, montmorillonite, beidellite, nontronite, volkon scoreite, saponite, hectorite, fluorine hectorite, sauconite, swinholderite, vermiculite, fluorine vermiculite, vercerin, sericite, amesite, keriaite, freiponite, blindlyite, bentonite, zeolite, biotite, phlogopite, fluorine phlogopite, iron mica, yeast nightite, teniolite, siderophyllite, tetra-ferrite mica, phlogopite, fluorine tetra silicon mica, polylithionite, muscovite, ceradonite, iron ceradonite, iron aluminoceladonite, aluminoceladonite, Tobelite, soda mica, soda mica, Kinoshita, vitreous mica, Ananda stone, pearlite, clinochlora, chamosite, pennantite, nimite, bailicroa, dombasite, kukeasite, sudoite, hydrotalcite, calcium silicate, magnesium silicate, aluminum silicate, diatomaceous earth, silica sand, etc.

Among the materials exemplified above, particles of silica, alumina, kaolin, Mania, aluminum silicate, or barium sulfate, having excellent acid resistance, oxidation resistance and high hydrophilicity, are preferable as the particles used for a separator for lead acid storage batteries. In a lead acid storage battery comprising a porous body as a separator, it is necessary to uniformly disperse sulfate ions in an electrolytic solution in order to inhibit stratification. In order to make the sulfate ions uniform, it is necessary for the separator to have an action of inhibiting precipitation of the sulfate ions released from the electrode surface by the cell reaction. Therefore, from the viewpoint of adsorbing/holding sulfate ions on the surface of the inorganic particles by electrostatic interaction, particles of alumina, silica, or kaolin, etc., are preferably used. Moreover, barium sulfate is preferably used as the inorganic particles from the standpoint of rendering fine sulfation substances having low conductivity, formed on the positive electrode and the negative electrode of the lead acid storage battery, in the separator for lead acid storage batteries according to the present embodiment.

The particles according to the present embodiment may be used alone or in combination of two or more.

The particle diameter of the particles is preferably 200 μm or less, more preferably 100 μm or less, still more preferably 70 μm or less, and even still more preferably 50 μm or less, from the viewpoint of forming fine pores in the porous body. The particle diameter is preferably an average particle diameter from the viewpoint of forming fine pores in the overall porous body. Moreover, when the particle becomes fine powder, the powder easily scatters at the time of weighing or at the time of preparing a slurry, and therefore in view of workability, the particle diameter of the particle is preferably 0.01 μm or larger, more preferably 0.1 μm or larger, still more preferably 0.3 μm or larger, still more preferably 0.5 μm or larger, still more preferably 1 μm or larger, still more preferably 2 µm or larger, still more preferably 5 µm or larger, or still more preferably 8 µm or larger. The particle diameter is preferably an average particle diameter from the viewpoint that all particles are hardly scattered on average.

Moreover, when the particle is barium sulfate, the particle diameter of barium sulfate is preferably 200 µm or smaller, more preferably 100 µm or smaller, still more preferably 70 µm or smaller, still more preferably 50 µm or less, still more preferably 20 µm or smaller, still more preferably 10 µm or smaller, still more preferably 5 µm or smaller, still more preferably 2 µm or smaller, or still more preferably 1 µm or smaller, from the viewpoint of rendering fine the sulfation substances described above. The particle diameter is preferably an average particle diameter from the viewpoint of rendering fine the sulfation substances formed on the electrodes of a lead acid storage battery over a wide range thereof. Further, from the viewpoint of workability explained above, the particle diameter of the barium sulfate particle is preferably 0.01 µm or larger, more preferably 0.1 µm or larger, still more preferably 0.3 µm or larger, or still more preferably 0.5 µm or larger. The particle diameter is preferably the average particle diameter from the viewpoint that all particles of powder is blown away on average. The particle diameter d (µm) in the present description is a diameter of a particle observed when observing the cross section of the porous body with a scanning electron microscope (SEM). When the observed particle is not spherical, the particle diameter d is obtained according to the following formula:

$$d=(d1+d2)/2$$

where d1 (µm) is the maximum diameter of the particle confirmed from the observation and d2 (µm) is the minimum diameter of the particle. Moreover, the average particle diameter in the present description is obtained by calculating a particle diameter d of each of 50 particles randomly selected upon the observation described above by the aforementioned method and determining an arithmetic mean value of the particle diameters obtained of the 50 particles. For example, the average particle diameter of the inorganic particle is obtained by calculating a particle diameter d of each of 50 inorganic particles randomly selected upon the above observation by the aforementioned method and determining an arithmetic mean value of the particle diameters obtained of the 50 inorganic particles.

<<Fiber>>

The porous body according to the present embodiment preferably contains fibers from the viewpoint of increasing the strength by entanglement of the fibers, and/or from the standpoint of holding the particles described above between a plurality of fibers to reduce a pore diameter. From these viewpoints, the fibers may be inorganic fibers or organic fibers for use without any particular limitation. Incidentally, the fiber diameter in the present description is a fiber diameter $\Phi$ (µm) of the fiber contained in the porous body, which is observed by observing the cross section of the porous body with a scanning electron microscope (SEM). When the fiber cross section is not a perfect circle, the fiber diameter $\Phi$ is expressed by the following formula:

$$\Phi=(\Phi1+\Phi2)/2$$

where the diameter of the inscribed circle of the fiber cross section is 01 (µm) and the diameter of the circumscribed circle of the fiber cross section is D2 (µm). Moreover, the average fiber diameter in the present description is obtained by calculating a fiber diameter $\Phi$ of each of 50 fibers randomly selected from the porous body by the method described above upon the observation of the cross section of the porous body, and determining an arithmetic mean value of the fiber diameters obtained of the 50 fibers. For example, the average fiber diameter of the inorganic fibers refers to an arithmetic mean value which is obtained by calculating a fiber diameter $\Phi$ of each of 50 inorganic fibers randomly selected upon the above observation by the aforementioned method and determining an arithmetic mean value of the fiber diameters of the 50 inorganic fibers.

<<Inorganic Fiber>>

The material of the inorganic fiber, for example, include the materials exemplified in the materials of the inorganic particles described above. Among these, by using glass fibers or alumina fibers, wettability with dilute sulfuric acid that is an electrolytic solution is improved in a lead acid storage battery comprising a porous body as a separator, facilitating the electrolytic solution to permeate into the separator. As a result, it is possible to inhibit oxygen and hydrogen gases generated from the electrodes upon charging of the lead acid storage battery from being retained in the separator, and to inhibit an increase in electrical resistance. From this point of view, the porous body according to the present embodiment preferably contains inorganic fibers, and particularly preferably contains inorganic fibers such as glass fibers or alumina fibers, etc. Moreover, from the viewpoint of inhibiting stratification of the lead acid storage battery, the porous body preferably contains inorganic fibers such as glass fibers or alumina fibers, etc. Among the glass fibers, it is preferred to use a composition excellent in acid resistance (for example, a C glass composition) in consideration of acid resistance to dilute sulfuric acid that is an electrolytic solution of a lead acid storage battery. Further, from the viewpoint of improving the membrane strength of the separator due to entanglement of fibers, wool-like glass fibers are preferably used.

Moreover, from the viewpoint of forming fine pores in the porous body by network structure formed by the inorganic fibers and/or from the viewpoint of inhibiting stratification in an electrolytic cell of the lead acid storage battery described above, the average fiber diameter of the inorganic fiber is 500 µm or smaller, more preferably 100 µm or smaller, still more preferably 50.0 µm or smaller, still more preferably 30.0 µm or smaller, still more preferably 20.0 µm or smaller, still more preferably 10.0 µm or smaller, still more preferably 5.0 µm or smaller, still more preferably 3.0 µm or smaller, still more preferably 2.0 µm or smaller, still more preferably 1.5 µm or smaller, or still more preferably 1.0 µm or smaller. Moreover, from the viewpoint of difficulty in manufacturing, the average fiber diameter of the inorganic fiber is preferably 0.05 µm or larger, more preferably 0.1 µm or larger, still more preferably 0.3 µm or larger, and even still more preferably 0.5 µm or larger.

<<Sheath-Core Type Binder Fiber>>

The porous body according to the present embodiment exhibits high thermal resistance, in particular high thermal resistance in dilute sulfuric acid (weight retainability and shape retainability), since the sheath-core type binder fibers are contained in the porous body and these form a three-dimensional network structure inside the porous body, which is firmly bound due to the melting component of the sheath.

The sheath-core type binder fiber in the present description is a fiber in which a part or a whole surface of the fiber (core) is covered with an organic component (sheath) having a melting point of 220° C. or lower, and it is defined as a fiber having a melting point of the core higher than that of the sheath. In general, considering that the wet paper drying step used in the wet papermaking step is lower than 200° C., a part or the whole surface of the sheath-core type binder fiber preferably has a melting point of lower than 200° C. It is not necessary for the sheath to cover the entire surface of the core, but from the viewpoint of uniformly and firmly binding the sheath-core type binder fibers with the peripheral material, the sheath covers preferably 20% or more of the surface area of the sheath-core type binder fiber (core), more preferably 50% or more, even more preferably 70% or more, and most preferably 100% of the area. For example, as with a side-by-side type binder fiber (a fiber in which two or more kinds of fibers having different melting points are composited as the same fiber in the longitudinal direction of the fiber), a fiber in which a part of the fiber (core) surface is covered with an organic component (sheath) having a lower melting point than the core, is also included in the sheath-core type binder fiber according to the present embodiment in a broad sense. Moreover, the sheath is not restricted to one type of composition, and two or more types of sheath compositions may cover the core. In this case, the fiber having the highest melting point contained in the sheath-core type binder fiber is regarded as the core. Considering the uniform binding between a plurality of types of materials in the porous body, a sheath-core type binder fiber in which the entire core surface is covered with a sheath having one type of composition is preferred. Further, the entire core surface is preferably covered with an organic component (sheath) in consideration of uniform binding between plural kinds of materials in the porous body. The cross section obtained by cutting the sheath-core type binder fiber in the direction perpendicular to the longitudinal direction of the fiber and in the lateral direction does not need to be circular, however it is preferably circular in view of uniformly binding with other materials of the porous body. The shape of the core occupying the cross section can be arbitrarily determined and is preferably circular from the same viewpoint. Moreover, a fiber in which the surface of the inorganic fiber (for example, glass fiber) is coated with an organic component (sheath) having a melting point of 220° C. or lower, and the melting point of the inorganic fiber is higher than the melting point of the organic component, is also included in the sheath-core type binder fiber according to the present embodiment in a broad sense. In the present description, the fiber in which a surface of the inorganic fiber is covered with an organic component (sheath) having a melting point of 220° C. or lower is regarded as a sheath-core type binder fiber, and is distinguished from the aforementioned inorganic fiber (fiber consisting only of the inorganic component). Considering the viewpoint of fabricating a light porous body as well as the viewpoint of facilitating the inorganic fibers to break and cut due to the stress applied when the porous body is densified (by pressing process, etc.), both the core and the sheath of the sheath-core type binder fiber are preferably organic components.

Incidentally, the melting component in the present description refers to the sheath of the sheath-core type binder fiber described above. Moreover, the non-melting component of the sheath-core type binder fiber according to the present embodiment refers to the core of the sheath-core type binder fiber.

Further, the melting point in the present description is a melting temperature at which the material starts to melt and deform when the material is heated in air from room temperature at a rate of temperature rise of 10° C./min. It should be noted that the melting includes softening accompanied by shape change. For example, when a specific sheath-core type binder fiber is allowed to stand in a state of having a contact point with another material (for example, fiber or particles or a resin binder, etc.), and heated from room temperature to 220° C. at a rate of temperature rise of 10° C./min, followed by cooling to room temperature, the melting point of the melting component in the sheath-core type binder fiber is 220° C. or lower in the case that the surface of the sheath-core type binder fiber is melted and deformed to form a fusion point with another material, or in the case that the cross-sectional shape of the sheath-core type binder fiber changes.

The porous body according to the present embodiment contains the sheath-core type binder fiber and the resin binder, the solid content of which is contained in an amount of more than 5.0 parts by weight and less than 50 parts by weight with respect to 100 parts by weight of the porous body, and exhibits high thermal resistance owing to the material design so as to satisfy the relation $P/B>0.070$ wherein P is a penetration strength (N) of the porous body and B is a basis weight ($g/m^2$) of the porous body. For example, when the porous body is used as a separator for lead acid storage batteries, it exhibits high thermal resistance in dilute sulfuric acid. The sheath-core type binder fiber is not restricted to a specific type provided that the constituent materials of the porous body are so designed as described above.

Since the core of the sheath-core type binder fiber does not melt but remains in a fibrous state when heated and dried, for example, in a wet papermaking process (for example, drying at a temperature of the melting point of the sheath or higher and lower than the melting point of the core), the melting component facilitates to stay in the periphery of the core and hardly wets other materials (for example, inorganic fibers, particles, etc.) and hardly spreads thereto. Therefore, when the porous body is used as a membrane of a battery separator, it inhibits an increase in the electrical resistance due to clog-up of pores of the porous body. Moreover, when the sheath melts during heating and drying, the core remains in a fibrous state in the porous body, and therefore, a strong three-dimensional network structure can be formed in the porous body by binding of the network structure of the core fibers and the melting component derived from the sheath, which leads to an increase in the strength of the porous body. Further, when the porous body is used as a separator for lead acid storage batteries, the melting component of the sheath-core type binder fiber according to the present embodiment is preferably polyester having a melting point of lower than 200° C., from the viewpoint of achieving both high membrane strength and low electrical resistance. On the other hand, polyester having a melting point of 200° C. or higher is preferred as the non-melting component of the sheath-core type binder fiber. In the case of a melting component having a melting point of lower than 200° C., it is possible to fabricate a porous body at a relatively low heat drying temperature. Moreover, an all-melting type binder fiber has also been known as a binder fiber, however, it has a high proportion of the melting component occupied in the fiber, compared with a sheath-core type binder fiber having the same length and the same diameter, and facilitates to wet other materials (for example, fibers, particles, etc.) and spread thereto, which is apt to increase an electrical resistance when the porous body is consequently used as a separator. Further, when the all-melting type binder fiber is heated above the melting point, since there is no component that remains unmelted as is the case with the core portion of the sheath-core type binder fiber, the entire fiber melts and facilitates to wet and spread to other materials, which results in formation of a thin region of the melting component and lowers the mechanical membrane strength of the porous body, compared with that of the sheath-core type binder fiber. Therefore, the porous body according to the present embodiment preferably uses the sheath-core type binder fiber.

The sheath-core type binder fiber according to the present embodiment is not limited to a specific resin composition, however when the porous body is used as a separator for lead acid storage batteries, polyethylene terephthalate (PET), poly-1,3-trimethylene terephthalate (PTT), polybutylene terephthalate (PBT), polyolefins (for example, polypropylene, polyethylene), etc., which are chemically stable for dilute sulfuric acid in an electrolytic solution of lead acid storage batteries, are exemplified as the core composition of the sheath-core type binder fiber, and PET being low-priced and having a specific gravity lower than that of water (i.e., it is unlikely to float on the surface of a slurry during preparation of the aqueous slurry.) is preferable. Moreover, the core may be inorganic components such as glass or alumina, etc.

For example, the sheath composition of the sheath-core type binder fiber is preferably an organic component from the viewpoint of melting the sheath at a low temperature, and polyesters having a melting point of lower than 200° C., polyolefins (polyethylene, polypropylene, etc.), EVOH (ethylene-vinyl copolymers), etc., can be exemplified, and among them, polyester, polyethylene, and polypropylene that are chemically stable for dilute sulfuric acid in the electrolytic solution of the lead acid storage battery, are preferable. Polyester is preferred because the melting component thereof hardly wets the hydrophilic inorganic particles or glass fibers and hardly spreads thereto and hardly clogs up pores of the porous body, facilitating to inhibit an increase in resistance when the porous body is used as a battery separator, and polyester having a melting point of 220° C. or lower is more preferred, and polyester having a melting point of lower than 200° C. is still more preferred, from the viewpoint of lowering the processing temperature during the production of the separator.

Moreover, either an amorphous sheath or a crystalline sheath may be selected in the sheath-core type binder fiber according to the present embodiment. In the case of an amorphous fiber, it is excellent in binding property due to the melting component of the sheath-core type binder fiber, and when it is crystalline, it is excellent in oxidation resistance, chemical resistance, etc., so that it may be changed according to an application of the porous body. Amorphous polyester and crystalline polyester can be exemplified as the sheath. From the viewpoint of lowering the processing temperature, these polyesters preferably have a melting point of 220° C. or lower and more preferably have a melting point of lower than 200° C.

A typical sheath-core type binder fiber includes a fiber consisting of a PET core having a melting point of 200° C. or higher and a polyester sheath having a melting point of lower than 200° C., fiber consisting of a PET core having a melting point of 200° C. or higher and a polyethylene sheath having a melting point of lower than 200° C., fiber consisting of a PET core having a melting point of 200° C. or higher and a polypropylene sheath having a melting point of lower than 200° C., fiber consisting of a polyethylene or polypropylene sheath having a melting point of lower than 200° C. and a polypropylene core having a higher melting point than the sheath, fiber consisting of a PET core having a melting point of 200° C. or higher and an EVOH sheath having a melting point of lower than 200° C., etc. Among these, when the porous body is used as a separator for lead acid storage batteries, a fiber consisting of a PET core having a melting point of 200° C. or higher and a polyester sheath having a melting point of lower than 200° C., is preferred from the viewpoint of inhibiting an increase in electric resistance and increasing resistance to dilute sulfuric acid.

The weight ratio of the sheath component and the core component of the sheath-core type binder fiber (melting component weight (g)/non-melting component weight (g)) can be changed arbitrarily within the range satisfying P/B>0.070 of the porous membrane according to the present embodiment, however, from the viewpoint of forming a three-dimensional network structure due to sheath-core type binder fibers in the porous body and increasing the binding force between the fibers of the network structure to improve thermal resistance in dilute sulfuric acid (weight retainability, shape retainability), the ratio is preferably 0.06 or more, more preferably 0.10 or more, still more preferably 0.15 or more, still more preferably 0.20 or more, still more preferably 0.30 or more, still more preferably 0.40 or more, still more preferably 0.50 or more, or still more preferably 0.60 or more. Moreover, if the melting component melts upon heating and drying of the porous body and the fibrous non-melting component remains in the porous body, the strength derived from the non-melting component will be able to be imparted to the porous body, or by reducing the proportion of the melting component occupied in the sheath-core type binder fiber, filling pores of the porous body with the melting component can be inhibited, and therefore, the weight ratio (melting component weight (g)/non-melting component weight (g)) is 50 or less, more preferably 10 or less, still more preferably 9.0 or less, still more preferably 8.0 or less, still more preferably 7.0 or less, still more preferably 6.0 or less, still more preferably 5.0 or less, still more preferably 4.0 or less, still more preferably 3.0 or less, still more preferably 2.0 or less, or still more preferably 1.6 or less.

Moreover, since the lower the melting point of the sheath of the sheath-core type binder fiber is, the lower the heat resistance is, whereas the higher the melting point becomes, the higher the heat-drying temperature required to sufficiently melt the sheath becomes, and therefore, the melting point of the sheath component is preferably higher than 50° C. and 220° C. or lower, more preferably higher than 60° C. and lower than 200° C., still more preferably 65° C. to 190° C., still more preferably 85° C. to 170° C., still more preferably 90° C. to 150° C., or still more preferably 100° C. to 150° C. Further, as the melting point of the core of the sheath-core type binder fiber lowers, the melting point of the sheath also inevitably decreases, which lowers the heat resistance, and therefore the melting point of the core is preferably 60° C. or higher, more preferably 100° C. or higher, still more preferably 150° C. or higher, still more preferably higher than 200° C., still more preferably higher than 220° C., or still more preferably 240° C. or higher.

Moreover, in the case of wet papermaking of the porous body according to the present embodiment, the specific gravity of the sheath-core type binder fiber is preferably larger than the specific gravity of water, from the viewpoint of inhibiting the fibers from floating in the aqueous slurry surface layer and of uniformly dispersing the sheath-core type binder fibers. From such a viewpoint, polyester is preferably contained in the composition of the sheath-core type binder fiber according to the present embodiment, and the sheath-core type binder fiber having a PET core and a polyester sheath is more preferred.

<<Organic Fibers (Excluding Sheath-Core Type Binder Fiber)>>

In the porous body according to the present embodiment, an organic fiber other than the sheath-core type binder fiber can be combined for use in addition to the sheath-core type binder fiber described above. The organic fiber other than the sheath-core type binder fiber preferably has a melting point of 200° C. or higher, more preferably 220° C. or higher, and still more preferably 230° C. or higher from the viewpoint of improving thermal resistance. As organic fibers other than sheath-core type binder fiber, polyethylene terephthalate (PET) fiber having excellent acid resistance and being inexpensive, poly-1,3-trimethylene terephthalate (PTT) fiber, polybutylene terephthalate (PBT) fiber, carbon fiber, polyamide fiber such as PAST having excellent thermal resistant, cellulose fiber, etc. It is also possible to use fibers other than these examples within the range where the effect of the present invention is exhibited.

The organic fibers described above may be used alone or in combination of two or more. The fiber length of the sheath-core type binder fiber and the organic fiber other than the sheath-core type binder fiber is preferably 0.5 mm or longer, more preferably 1 mm or longer, still more preferably 2 mm or longer, or 3 mm or longer, from the standpoint of increasing the number of binding points with the materials per fiber to increase the strength of the porous body, in particular the membrane strength in the case of a membrane form. Moreover, from the viewpoint of inhibiting entanglement of fibers in the slurry during wet papermaking and enhancing dispersibility of the fibers in the slurry, the fiber length is preferably 300 mm or shorter, more preferably 100 mm or shorter, still more preferably 50 mm or shorter, still more preferably 30 mm or shorter, still more preferably 15 mm or shorter, still more preferably 10 mm or shorter, or still more preferably 8 mm or shorter.

From the viewpoint of inhibiting entanglement of the fibers in the slurry during wet papermaking and enhancing dispersibility of the fibers in the slurry, the average fiber size (diameter) of the sheath-core type binder fiber and the organic fiber other than the sheath-core type binder fiber, is preferably 0.1 nm or larger, more preferably 0.5 nm or larger, still more preferably 1 µm or larger, still more preferably 3 µm or larger, still more preferably 5 µm or larger, or still more preferably 8 µm or larger. Moreover, when fibers having the same weight and the same fiber length are imparted to the porous body, the smaller the diameter of the fiber is, the larger the number of fibers is, which enables to impart a dense network structure of the fibers. Therefore, the average fiber diameter of the sheath-core type binder fiber and the organic fiber other than the sheath-core type binder fiber is preferably 500 nm or shorter, more preferably 50 µm or shorter, still more preferably 30 nm or shorter, still more preferably 25 nm or shorter, or still more preferably 20 nm or shorter.

<<Resin Binder>>

The resin binder contained in the porous body according to the present embodiment is an organic component (solid content) excluding the organic component of the fibers and the organic component of the particles in the organic components contained in the porous body. By using the resin binder in the porous body, it is possible to improve the thermal resistance of the porous body, for example, the thermal resistance in dilute sulfuric acid (particularly weight retainability). The resin binder is distinguished from the particles in that it has no particle shape in the porous body. When the binder component of the resin binder melts in the heating and drying step of a series of wet papermaking processes, etc. and fills most of the pores of the porous body, the electrical resistance of the storage battery comprising the porous body as a separator increases. From the viewpoint of inhibiting flowability of the binder component upon heating and leaving pores in the separator to maintain low electric resistance, the resin binder according to the present embodiment is preferably those to be exemplified below.

Preferred resin binders, for example, include an acrylic-based resin binder, styrene-based resin binder, acrylic/urethane-based resin binder, acrylic/styrene-based resin binder, vinyl acetate/acrylic-based resin binder, styrene/butadiene-based resin binder, acrylonitrile/butadiene-based resin binder, natural rubber-based resin binder, polybutadiene-based resin binder (BR resin binder), methyl methacrylate/butadiene-based resin binder, 2-vinylpyridine/styrene/butadiene-based resin binder (VP resin binder), chloroprene resin binder (CR latex), polyolefin-based resin binders such as polyethylene, polypropylene, polybutene or a copolymer thereof, etc., modified polyolefin-based resin binder obtained by chlorinating or acid-modifying the polyolefin-based resin binder, fluorine-containing resin binders such as polyvinylidene difluoride or polytetrafluoroethylene, etc., fluorine-containing rubber binders such as vinylidene difluoride-hexafluoropropylene-tetrafluoroethylene copolymer or ethylene-tetrafluoroethylene copolymer, etc., (meth) acrylic acid-styrene-butadiene copolymer resin binder and hydrides thereof, polyvinyl alcohol resin binder, polyvinyl alcohol/polyacetate copolymer resin binder, etc.

Among the specific examples described above, the acrylic-based resin binder or styrene-based resin binder is excellent in binding property with particles or fibers, and excellent in acid resistance, and it is more preferable when using a porous body for a separator for lead acid storage batteries.

Incidentally, the binder that is referred to as acrylic-based resin binder in the present description, includes polymers such as an acrylic/urethane-based resin binder, acrylic/styrene-based resin binder, acrylic/styrene/butadiene-based resin binder, vinyl acetate/acrylic-based resin binder, acrylic resin binder, etc.

Moreover, what is referred to as a styrene resin binder in the present description includes polymers such as an acrylic/styrene-based resin binder, styrene/butadiene-based resin binder, acrylic/styrene/butadiene-based resin binder, 2-vinylpyridine/styrene/butadiene-based resin binder, styrene resin binder, etc.

These resin binders may contain one or more other components in the composition exemplified above.

It should be noted that the resin binder according to the present embodiment is not limited to one type, and a plurality of types can be combined for use within a range in which the effects of the present invention can be obtained. For example, a combination of an acrylic-based resin binder and a styrene-based resin binder, etc., can be exemplified.

When the resin binder has a glass transition temperature (Tg), Tg is preferably −50° C. or higher from the viewpoint of increasing the thermal resistance of the resin binder component, and it is preferably 70° C. or lower from the viewpoint of increasing the binding force between a plurality of materials. For the same reason, Tg is more preferably −30° C. or higher and 50° C. or lower and still more preferably −30° C. or higher and 30° C. or lower.

From the viewpoint of evenly distributing the resin binder component in the porous body to form a strong binding between multiple materials, and from the standpoint of enhancing the thermal resistance of the separator in dilute sulfuric acid while inhibiting an increase in the electrical resistance by leaving fine pores when the porous body is used as a battery separator, a resin binder in which fine polymer particles are dispersed in a liquid dispersion medium, i.e., a latex is preferably used as the resin binder according to the present embodiment. By using the latex, the polymer particles uniformly distribute inside the porous body to bind with various constituent materials while leaving pores in the porous body, which thus enables to enhance the thermal resistance of the porous body, for example, thermal resistance of the porous body in dilute sulfuric acid (in particular, weight retainability).

Moreover, since various constituent materials (for example, resin binder, particles, fibers, etc.) are uniformly distributed in the porous body and the binding between these materials is strengthened, so that thermal resistance, especially the thermal resistance in dilute sulfuric acid is increased, the porous body according to the present embodiment is preferably a wet papermaking porous body. The wet papermaking porous body in the present description is obtained by passing through a mesh the liquid containing for example a resin binder, fibers and/or particles (hereinafter, the liquid in which the solid contents are dispersed is referred to as "slurry"), and heating and drying the solid contents in the slurry deposited on the mesh. From the viewpoint of consideration for the environment, the liquid used in the slurry is preferably water or an aqueous system. Therefore, a resin binder in which fine polymer particles are dispersed in water or an aqueous liquid dispersion medium, i.e., an aqueous latex, is also preferably used for the resin binder according to the present embodiment. The porous body according to the present embodiment can be fabricated by adding the latex to the slurry and depositing the mixture on a mesh followed by drying. As another fabrication method, the porous body according to the present embodiment can be obtained by preliminarily fabricating a nonwoven fabric containing fibers as a main component (for example, 50% by weight or more), and dipping the nonwoven fabric in a slurry containing the resin binder and/or particles, or coating the surface of the nonwoven fabric with the slurry containing the resin binder and/or the particles followed by drying.

In the present description, a porous body containing a resin binder refers to a porous body containing a resin binder solid content.

<<Mixing Ratio of Various Materials>>

In the porous body according to the present embodiment, from the viewpoint of increasing the binding strength between the resin binder and the other materials in the porous body, and enhancing thermal resistance, more specifically, the thermal resistance in dilute sulfuric acid (particularly weight retainability), the resin binder solid content with respect to 100 parts by weight of the porous body is preferably more than 5.0 parts by weight, more preferably 5.1 parts by weight or more, still more preferably 5.3 parts by weight or more, still more preferably 5.5 parts by weight or more, still more preferably 5.7 parts by weight or more, still more preferably 6.0 parts by weight or more, still more preferably 6.5 parts by weight or more, still more preferably 7.0 parts by weight or more, still more preferably 7.5 parts by weight or more, still more preferably 8.0 parts by weight or more, still more preferably 9.0 parts by weight or more, still more preferably 9.5 parts by weight or more, or still more preferably 10 parts by weight or more.

Moreover, as the weight ratio of the resin binder contained in the porous body becomes higher, many independent pores (the pores sealed inside the porous body) are formed inside the porous body, and the internal pressure rises due to the gas inside the independent pores, giving rise to swelling (the shape retainability worsens) when the porous body is immersed in dilute sulfuric acid at an elevated temperature. From the viewpoint of reducing the number of independent pores occupied in the porous body (i.e., increasing the ratio of the percolated pores which are connected with each other), facilitating to release the gas to an outside of the porous body when the gas inside the porous body thermally expands, and inhibiting its swelling, the resin binder solid content relative to 100 parts by weight of the porous body, is preferably less than 50 parts by weight, more preferably 45 parts by weight or less, still more preferably 40 parts by weight or less, still more preferably 35 parts by weight or less, still more preferably 31 parts by weight or less, still more preferably 30 parts by weight or less, still more preferably 25 parts by weight or less, still more preferably 22 parts by weight or less, still more preferably 20 parts by weight or less, still more preferably 18 parts by weight or less, or still more preferably 15 parts by weight or less.

Further, from the viewpoint of adjusting the electrical resistance of the porous body when it is used as a separator for lead acid storage batteries to a value of 130 m$\Omega \cdot$cm$^2$ or less, the resin binder amount relative to 100 parts by weight of the separator is preferably 31 parts by weight or less, more preferably 30 parts by weight or less, still more preferably 25 parts by weight or less, still more preferably 22 parts by weight or less, still more preferably 20 parts by weight or less, still more preferably 18 parts by weight or less, or still more preferably 15 parts by weight or less.

In a porous body containing particles and/or inorganic fibers, the sheath-core type binder fiber and the resin binder, the resin binder binds to peripheral materials in the porous body and enhances thermal resistance (mainly weight retainability). Since the sheath-core type binder fiber is firmly bound to the surrounding materials due to the fact that the fiber itself has a sheath (melting component), it has little effect of lowering the weight rentability due to fall-off of the sheath-core type binder fiber from the porous body in liquid at an elevated temperature. Therefore, from the viewpoint of enhancing the weight retainability in liquid at an elevated temperature, it is important to compound the resin binder in a predetermined ratio or more with respect to the particles and/or the inorganic fibers that are likely to detach from the porous body into the liquid.

When the porous body is used as a separator for lead acid storage batteries containing particles and/or inorganic fibers, the sheath-core binder fiber and the resin binder, the sheath-core type binder fiber itself has a sheath (melting component) and strongly binds to the peripheral materials, so that it has little effect of reducing the weight retainability due to detachment of the sheath-core type binder fiber from the porous body in dilute sulfuric acid at 80° C. Therefore, from the viewpoint of enhancing the weight retainability in diluted sulfuric acid at 80° C., a resin binder should be compounded in a predetermined ratio or more with respect to particles and/or inorganic fibers that are likely to detach from the separator in dilute sulfuric acid at 80° C.

From such a viewpoint, when the weight of the aforementioned particles contained in the porous body or the separator (for example, the separator for lead acid storage batteries) is Wp (g), the weight of the inorganic fibers is Wf (g), and the weight of the resin binder solid content is Wb(g), (Wp+Wf)/Wb is preferably less than 7.0, more preferably 6.9 or less, still more preferably 6.8 or less, still more preferably 6.7 or less, still more preferably 6.6 or less, still more preferably 6.5 or less, still more preferably 6.4 or less, still more preferably 6.3 or less, still more preferably 6.2 or less, still more preferably 6.1 or less, still more preferably 6.0 or less, still more preferably 5.9 or less, still more preferably 5.8 or less, still more preferably 5.7 or less, still more preferably 5.6 or less, still more preferably 5.5 or less, still more preferably 5.4 or less, still more preferably 5.1 or less, still more preferably 4.8 or less, or still more preferably 4.5 or less.

Moreover, as the value of (Wp+Wf)/Wb becomes lower, the weight of the resin binder solid content with respect to the sum of the weights of the particles and the inorganic fibers becomes larger, and the independent pores are facilitated to be formed inside the porous body. Therefore, as the value of (Wp+Wf)/Wb of the porous body or the separator for lead acid storage batteries becomes lower, swelling facilitates to occur due to increase in internal pressure of the gas in the independent pores in liquid at an elevated temperature (in dilute sulfuric acid at 80° C. in the case of the separator for lead acid storage batteries), which worsens the shape retainability. Further, the electrical resistance increases as the ratio of resin binder solid content increases. In order to obtain high shape retainability in liquid at an elevated temperature or dilute sulfuric acid at 80° C. and a low electrical resistance, (Wp+Wf)/Wb of the porous body or the separator is preferably more than 0.6, more preferably 0.7 or more, still more preferably 0.8 or more, still more preferably 0.9 or more, or still more preferably 1.0 or more. From the viewpoint of adjusting the electrical resistance of the separator to a value of 130 mΩ·cm$^2$ or less, (Wp+Wf)/Wb of the separator is preferably 1.4 or more, more preferably 1.5 or more, still more preferably 1.7 or more, still more preferably 2.0 or more, still more preferably 2.2 or more, still more preferably 2.4 or more, still more preferably 2.6 or more, still more preferably 2.8 or more, still more preferably 3.0 or more, still more preferably 3.2 or more, still more preferably 3.4 or more, still more preferably 3.6 or more, still more preferably 3.8 or more, or still more preferably 4.0 or more.

The thermal resistance of the porous body or the weight/shape retainability of the separator for lead acid storage batteries tend to be attainable when (Wp+Wf)/Wb is within the numerical range described above, and the tendency is remarkable in the case of the amount of the melting component having a melting point of lower than 200° C. in the sheath-core type binder fibers contained in 100 parts by weight of the porous body, being 5.0 to 50 parts by weight.

Moreover, in the porous body containing inorganic particles as particles and/or glass fibers as inorganic fibers, the sheath-core type binder fibers and the resin binder, the resin binder binds to peripheral materials in the porous body, enhancing thermal resistance (mainly weight retainability). Since the sheath-core type binder fiber firmly binds to the peripheral materials due to having itself a sheath (melting component), it has little effect of lowering the weight retainability due to detachment of the sheath-core type binder fiber from the porous body in liquid at an elevated temperature. Therefore, from the viewpoint of enhancing the weight retainability in liquid at an elevated temperature, it is important to compound the resin binder in a predetermined ratio or more with respect to the inorganic particles and/or the glass fibers that are likely to fall off from the porous body into the liquid.

When the porous body is used as the separator for lead acid storage batteries containing inorganic particles and/or glass fibers, the sheath-core type binder fibers and the resin binder, the sheath-core binder fibers firmly bind to the spherical materials because the fiber itself has the sheath (melting components), there will be little influence that the sheath-core type binder fibers fall off from the porous body in dilute sulfuric acid at 80° C. to worsen the weight retainability. Therefore, from the viewpoint of increasing the weight retainability in dilute sulfuric acid at 80° C., it is important for the resin binder to be compounded in a predetermined proportion or more with respect to the inorganic particles and/or glass fibers that facilitates to fall off from the separator in dilute sulfuric acid at 80° C.

From such a viewpoint, when a weight of the inorganic particles contained in the porous body or the separator (for example, the separator for lead acid storage batteries) is Wi (g), a weight of the glass fiber is Wg (g), and a weight of the resin binder solid content is represented by Wb(g), (Wi+Wg)/Wb is preferably less than 7.0, more preferably 6.9 or less, still more preferably 6.8 or less, still more preferably 6.7 or less, still more preferably 6.6 or less, still more preferably 6.5 or less, still more preferably 6.4 or less, still more preferably 6.3 or less, still more preferably 6.2 or less, still more preferably 6.1 or less, still more preferably 6.0 or less, still more preferably 5.9 or less, still more preferably 5.8 or less, still more preferably 5.7 or less, still more preferably 5.6 or less, still more preferably 5.5 or less, still more preferably 5.4 or less, still more preferably 5.1 or less, still more preferably 4.8 or less, or still more preferably 4.5 or less.

Moreover, as the value of (Wi+Wg)/Wb becomes lower, the weight of the resin binder solid content becomes larger relative to the sum of the weights of the inorganic particles and the glass fibers, and the independent pores are facilitated to be formed inside the porous body. Therefore, as the value of (Wi+Wg)/Wb of the porous body or the separator for lead acid storage batteries becomes lower, swelling is likely to occur due to the internal pressure rise of the gas in the independent pores in the liquid at an elevated temperature (in dilute sulfuric acid at 80° C. in the case of the separator for lead acid storage batteries), which worsens the shape retainability. Moreover, the electrical resistance increases accompanied by the increase in the ratio of the resin binder solid content. In order to obtain high shape retainability in liquid at an elevated temperature or dilute sulfuric acid at 80° C. and a low electrical resistance, (Wi+Wg)/Wb of the porous body or the separator is preferably more than 0.6, more preferably 0.7 or more, still more preferably 0.8 or more, still more preferably 0.9 or more, or still more preferably 1.0 or more. From the viewpoint of adjusting the electrical resistance of the separator to a value of 130 mΩ·cm$^2$ or less, (Wi+Wg)/Wb of the separator is preferably 1.4 or more, more preferably 1.5 or more, still more preferably 1.7 or more, still more preferably 2.0 or more, still more preferably 2.2 or more, still more preferably 2.4 or more, still more preferably 2.6 or more, still more preferably 2.8 or more, still more preferably 3.0 or more, still more preferably 3.2 or more, still more preferably 3.4 or more, still more preferably 3.6 or more, still more preferably 3.8 or more, or still more preferably 4.0 or more.

When (Wi+Wg)/Wb is within the aforementioned numerical range, the thermal resistance of the porous body or the weight and shape retainability of the separator for lead acid storage batteries tends to be obtained, which is outstanding when the amount of the melting component having a melting point of lower than 200° C. in the sheath-core type binder fibers contained in 100 parts by weight of the porous body, is 5.0 to 50 parts by weight.

In the porous body according to the present embodiment, the sum of the weights of the particles and the inorganic fibers is preferably 5 parts by weight to 80 parts by weight relative to 100 parts by weight of the porous body. When the compounding ratios of the hydrophilic particles and the inorganic fibers contained in the porous body are high, the separator facilitates to wet with dilute sulfuric acid that is an electrolytic solution in the lead acid storage battery comprising the porous body as a separator. Moreover, since the weights of the resin binder and the sheath-core type binder fibers are relatively reduced by increasing the sum of the weights of the particles and the inorganic fibers, and the electrical resistance of the porous body used as the separator is likely to be reduced, the sum of the weights of the particles and the inorganic fibers relative to 100 parts by weight of the porous body is preferably 5 parts by weight or more, more preferably 10 parts by weight or more, still more preferably 15 parts by weight or more, and still more preferably 20 parts by weight or more, still more preferably 30 parts by weight or more, or still more preferably 40 parts by weight or more. Further, if the compounding ratios of the particles and the inorganic fibers are high in the porous body used as the separator for lead acid storage batteries, the compounding ratios of the resin binder and the sheath-core type binder fibers will become relatively low, and the thermal resistance in dilute sulfuric acid is apt to be lowered as well as the membrane strength is likely to be worsened, so that the sum of the weights of the particles and the inorganic fibers relative to 100 parts by weight of the porous body is preferably 80 parts by weight or less, more preferably 70 parts by weight or less, still more preferably 67 parts by weight or less, still more preferably 65 parts by weight or less, still more preferably 63 parts by weight or less, still more preferably 60 parts by weight or less, still more preferably 58 parts by weight or less, or still more preferably 55 parts by weight or less. Incidentally, the inorganic particles are preferable as the hydrophilic particles, and silica particles are particularly preferable among these. Further, glass fibers exhibiting an effect of inhibiting stratification when a porous body is used as a separator for lead acid storage batteries, are preferred as the hydrophilic inorganic fibers.

The porous body according to the present embodiment preferably contains 3 to 70 parts by weight of particles with respect to 100 parts by weight of the porous body. From the viewpoint of reducing a pore size of the porous body used as a battery separator to fabricate a separator having high resistance to a dendrite short circuit, and from the standpoint of enabling to inhibit a short circuit occurred due to the active material that has fallen off from the electrode and entered inside of the separator, the content of the particles relative to 100 parts by weight of the porous body is preferably 3 parts by weight or more, more preferably 5 parts by weight or more, still more preferably 8 parts by weight or more, still more preferably 10 parts by weight or more, still more preferably 15 parts by weight or more, still more preferably 20 parts by weight or more, or still more preferably 25 parts by weight or more. Moreover, since it is possible for the porous body used as a separator for lead acid storage batteries to enhance the wettability for an electrolytic solution by using the hydrophilic particles, the particles are preferably inorganic particles and more preferably silica particles. When the compounding ratio of the particles occupied in the separator is high, the compounding ratios of the inorganic fibers, the sheath-core type binder fibers, and the resin binder become relatively low (in particular, the compounding ratios of the sheath-core type binder fibers and the resin binder are relatively low), which lowers the binding between the plural kinds of materials, and hardly ensures the thermal resistance in dilute sulfuric acid (for example, weight retainability and shape retainability), so that the compounding amount of the particles with respect to 100 parts by weight of the porous body according to the present embodiment, is preferably 70 parts by weight or less, more preferably 60 parts by weight or less, still more preferably 55 parts by weight or less, still more preferably 50 parts by weight or less, still more preferably 45 parts by weight or less, still more preferably 40 parts by weight or less, or still more preferably 35 parts by weight or less.

The porous body according to the present embodiment preferably contains 3 to 70 parts by weight of inorganic fibers with respect to 100 parts by weight of the porous body. From the viewpoint of retaining the particles in the three-dimensional network structure of the inorganic fibers, the content of the inorganic fibers relative to 100 parts by weight of the porous body is preferably 3 parts by weight or more, more preferably 5 parts by weight or more, still more preferably 8 parts by weight or more, still more preferably 10 parts by weight or more, or still more preferably 15 parts by weight or more. Increasing the proportion of the inorganic fibers in the porous body and relatively decreasing the compounding ratios of the sheath-core type binder fibers and the resin binder, facilitate to weaken the binding between multiple materials, and for example the thermal resistance is hardly retained in dilute sulfuric acid, so that the content of the inorganic fibers relative to 100 parts by weight of the porous body is preferably 70 parts by weight or less, more preferably 60 parts by weight or less, still more preferably 55 parts by weight or less, still more preferably 50 parts by weight or less, still more preferably 45 parts by weight or less, still more preferably 40 parts by weight or less, still more preferably 30 parts by weight or less, or still more preferably 25 parts by weight or less. Incidentally, from the viewpoint of inhibiting stratification when the porous body is used as a separator of lead acid storage batteries and from the standpoint of enhancing wettability for an electrolytic solution by using hydrophilic inorganic fibers, the inorganic fibers are preferably glass fibers.

The porous body of the present embodiment preferably contains 5.0 parts by weight or more of the melting component of the sheath-core type binder fibers with respect to 100 parts by weight of the porous body. By increasing the weight ratio of the melting component contained in the porous body, the interfiber binding force derived from the three-dimensional network structure by the sheath-core type binder fibers and the binding force between the sheath-core type binder fibers and other materials, are strengthened, which enables to improve the thermal resistance in dilute sulfuric acid (shape retainability and weight retainability) when the porous body is used as a separator for lead acid storage batteries, and therefore, the content of the melting component of the sheath-core type binder fibers relative to 100 parts by weight of the porous body is preferably 5.0 parts by weight or more, more preferably 5.5 parts by weight or more, still more preferably 6.0 parts by weight or more, still more preferably 6.5 parts by weight or more, still more preferably 7.0 parts by weight or more, still more preferably 7.5 parts by weight or more, still more preferably 8.0 parts by weight or more, still more preferably 9.0 parts by weight or more, still more preferably 10 parts by weight or more, still more preferably 11 parts by weight or more, still more preferably 12 parts by weight or more, still more preferably 13 parts by weight or more, still more preferably 14 parts by weight or more, still more preferably 15 parts by weight or more, still more preferably 16 parts by weight or more, still more preferably 17 parts by weight or more, or still more preferably 18 parts by weight or more. Moreover, when the melting component of the sheath-core type binder fibers in the porous body is too large, the melting component clogs up the pores of the porous body, which may increase the electrical resistance of the porous body used as a battery separator. From the viewpoint of avoiding such a situation, the content of the melting component of the sheath-core type binder fibers is preferably 60 parts by weight or less, more preferably 50 parts by weight or less, and still more preferably 45 parts by weight or less relative to 100 parts by weight of the porous body. From the viewpoint of adjusting the electrical resistance when the porous body is used as a separator for lead acid storage batteries to a value of 130 mΩ·cm² or less, the content of the melting component of the sheath-core type binder fibers is 40 parts by weight or less, more preferably 35 parts by weight or less, still more preferably 30 parts by weight or less, or still more preferably 25 parts by weight or less with respect to 100 parts by weight of the separator for lead acid storage batteries. The melting component of the sheath-core type binder fibers facilitates to stay in the peripheral of the core, compared with the resin binder, and is unevenly distributed inside the porous body or the battery separator, which therefore enables to increase the binding force between the materials while inhibiting the formation of the independent pores inside the porous body or the battery separator. From that viewpoint, the sheath-core type binder fibers contribute to the improvement of the thermal resistance of the porous body.

The porous body of the present embodiment preferably contains 10 to 80 parts by weight of the sheath-core type binder fibers relative to 100 parts by weight of the porous body. When a plurality of porous bodies having the constant weight ratio of the core and the sheath of the sheath-core type binder fibers used for the porous bodies and the same density thereof, are compared, and the compounding ratio of the sheath-core type binder fibers contained in the porous body is high, then the compounding ratio of the melting component contained in the porous body is relatively increased, increasing the membrane strength of the porous body or the battery separator, and the porous body tends to exhibit a high thermal resistance in dilute sulfuric acid (in particular, high shape retainability) due to the three-dimensional network structure by the sheath-core type binder fibers when the porous body is used as a separator for lead acid storage batteries. From such a viewpoint, the content of the sheath-core type binder fibers with respect to 100 parts by weight of the porous body or the separator for lead acid storage batteries, is preferably 10 parts by weight or more, more preferably 12 parts by weight or more, still more preferably 14 parts by weight or more, still more preferably 16 parts by weight or more, still more preferably 17 parts by weight or more, still more preferably 18 parts by weight or more, still more preferably 19 parts by weight or more, still more preferably 20 parts by weight or more, still more preferably 23 parts by weight or more, still more preferably 25 parts by weight or more, still more preferably 27 parts by weight or more, still more preferably 30 parts by weight or more, still more preferably 32 parts by weight or more, or still more preferably 35 parts by weight or more. On the other hand, when the porous body contains hydrophilic inorganic particles or inorganic fibers and the compounding ratio of the sheath-core type binder fibers contained in the porous body is too high, the compounding ratios of the inorganic particles and the inorganic fibers are apt to be relatively low, and the wettability for dilute sulfuric acid of the porous body used as a separator for lead acid storage batteries, is reduced. When the compounding ratio of inorganic fibers (i.e., glass fibers) is low, the ability to inhibit stratification of lead acid batteries facilitates to decrease, and when the compounding ratio of inorganic particles (i.e., silica particles) is low, the pore diameter of the separator is likely to become large and the resistance to a dendrite short is apt to be low. For these reasons, the content of the sheath-core type binder fibers relative to 100 parts by weight of the porous body or the separator for lead acid storage batteries according to the present embodiment, is preferably 80 parts by weight or less, more preferably 70 parts by weight or less, still more preferably 65 parts by weight or less, still more preferably 55 parts by weight or less, still more preferably 50 parts by weight or less, or still more preferably 45 parts by weight or less.

The porous body according to the present embodiment can combine organic fibers other than the sheath-core type binder fibers for use in addition to the sheath-core type binder fibers. The organic fiber other than the sheath-core type binder fiber includes polyester fibers such as polyethylene terephthalate (PET) fiber, etc., poly-1,3-trimethylene terephthalate (PTT) fiber, polybutylene terephthalate (PBT) fiber, carbon fiber, polyamide fibers such as PAST that is excellent in thermal resistance, etc., cellulose fiber, polyolefin fiber (for example, polyethylene fiber or polypropylene fiber), etc. When the compounding ratio of the organic fibers other than the sheath-core type binder fibers is relatively high, the binding force between the materials is apt to be weak. From the viewpoint of increasing thermal resistance in dilute sulfuric acid (weight retainability and shape retainability), the amount of the organic fibers contained in 100 parts by weight of the porous body is preferably 60 parts by weight or less, more preferably 40 parts by weight or less, still more preferably 30 parts by weight or less, or still more preferably 25 parts by weight or less. Incidentally, the polyester fiber may be a fiber that has been stretched in the manufacturing process or an unstretched fiber. Moreover, an inorganic fiber, the surface of which is coated with an organic component is also included in the organic fiber according to the present embodiment in a broad sense (however, the sheath-core type binder fiber is excluded). In this case, from the viewpoint of imparting to the fiber the advantage of the organic fiber described above (which is hardly subjected to breakage against bending or external force), the organic component preferably covers 20% or more of the surface of the inorganic fiber, more preferably 50% or more, still more preferably 70% or more, and most preferably 100% of the surface.

<<Production Method of Porous Body>>

The porous body can be produced by any method, and for example, a slurry containing the fibers, resin binder, and particles, can be produced by a wet papermaking process. In this case, a coagulant and/or a dispersant, and other additives used in papermaking may be added to the slurry. Moreover, dispersants suitable for various fibers used for producing the porous body may be added to the slurry with an aim to enhance water dispersibility of the fibers in the slurry in the wet papermaking process. Further, it is possible to improve water dispersibility by preliminarily attaching a surfactant component to the surface of each fiber. As another production method, it is also possible to fabricate a porous body by preliminarily preparing a nonwoven fabric mainly comprising the fibers and impregnating the nonwoven fabric with a slurry containing the resin binder and/or inorganic particles followed by drying. Alternatively, a porous body can be fabricated by applying a slurry containing the resin binder and/or inorganic particles to the nonwoven fabric.

<<Thickness of Porous Body>>

The porous body according to the present embodiment may have any shape and is not restricted to a specific thickness since it exhibits high thermal resistance particularly in dilute sulfuric acid when containing the sheath-core type binder fibers and the resin binder, also containing the resin binder solid content in an amount of more than 5.0 parts by weight and less than 50 parts by weight relative to 100 parts by weight of the porous body, and satisfying P/B>0.070 wherein P is the penetration strength (N) of the porous body and B is the basis weight (g/m$^2$) of the porous body. However, considering that the porous membrane is disposed in the reduced space of an electrolytic cell of a lead acid storage battery and the membrane thickness is made thin to reduce electrical resistance when the porous body is used as, for example, a separator for lead acid storage batteries (porous membrane), the thickness of the porous membrane is preferably 10 mm or less, more preferably 5 mm or less, still more preferably 4 mm or less, still more preferably 3 mm or less, still more preferably 2 mm or less, still more preferably 1 mm or less, still more preferably 0.8 mm or less, or still more preferably 0.6 mm or less. Moreover, a penetration strength of the porous membrane decreases as the thickness becomes thinner when comparing a plurality of porous membranes having the same density, the same material composition, and the same structure, and therefore from the viewpoint of increasing the membrane strength, the thickness of the porous membrane is preferably 0.01 mm or more, more preferably 0.05 mm or more, still more preferably 0.10 mm or more, still more preferably 0.15 mm or more, still more preferably 0.20 mm or more, still more preferably 0.25 mm or more, or still more preferably 0.30 mm or more. It is noted that the thickness in the present description is measured according to the standard of BCIS-03A Rev December 15 which will be described in detail in Examples.

<<Penetration Strength and Basis Weight>>

The porous body according to the present embodiment is characterized in that the porous body according to the present embodiment contains the sheath-core type binder fibers and the resin binder, contains the resin binder solid content in an amount of more than 5.0 parts by weight and less than 50 parts by weight relative to 100 parts by weight of the porous body, and satisfies P/B>0.070 wherein P is the penetration strength (N) of the porous body and B is the basis weight (g/m$^2$) of the porous body. When the above conditions are satisfied, the porous body has high thermal resistance in liquid at an elevated temperature. Specifically, when the above conditions are satisfied, the porous body used as the separator for lead acid storage batteries exhibits high thermal resistance in dilute sulfuric acid that is an electrolytic solution of a lead acid storage battery. Usually, when the basis weight of the porous body is increased with the same material composition and the same production method, the penetration strength is increased. Since the B is the weight of the porous body per unit area, the high P/B refers to having the strong binding force between a plurality of materials constituting the porous body. From the viewpoint of enhancing thermal resistance (particularly shape retainability) in liquid, for example, dilute sulfuric acid, P/B is preferably more than 0.070, more preferably 0.075 or more, still more preferably 0.080 or more, still more preferably 0.085 or more, still more preferably 0.086 or more, still more preferably 0.090 or more, still more preferably 0.095 or more, still more preferably 0.100 or more, still more preferably 0.110 or more, still more preferably 0.120 or more, still more preferably 0.130 or more, still more preferably 0.140 or more, or still more preferably 0.150 or more. The method of adjusting the P/B to a value exceeding 0.070 is not limited to the following within a range in which the effect of the present invention is achieved, however, from the viewpoint of increasing the P/B, the amount of the melting component of the sheath-core type binder fibers with respect to 100 parts by weight of the porous body according to the embodiment, is preferably 5 parts by weight or more, more preferably 5.5 parts by weight or more, still more preferably 6 parts by weight or more, still more preferably 6.5 parts by weight or more, still more preferably 7 parts by weight or more, still more preferably 7.5 parts by weight or more, still more preferably 8 parts by weight or more, still more preferably 9 parts by weight or more, still more preferably 10 parts by weight or more, still more preferably 11 parts by weight or more, still more preferably 12 parts by weight or more, still more preferably 13 parts by weight or more, still more preferably 14 parts by weight or more, still more preferably 15 parts by weight or more, still more preferably 16 parts by weight or more, still more preferably 17 parts by weight or more, or still more preferably 18 parts by weight or more. Moreover, by increasing the density D (g/m$^2$/mm) of at least a portion of the porous body, the binding area between a plurality of materials (in particular between the melting component of the sheath-core type binder fibers and the material in the peripheral thereof) is increased to facilitate to obtain a high P/B.

As the weight of the melting component of the sheath-core type binder fibers increases and the binding force between a plurality of materials becomes strong, with respect to the weight of the porous body according to the present embodiment, the value of P/B becomes large. If the amount of the melting component of the sheath-core type binder fibers in the porous body is too large, the melting component will clog up pores in the porous body and the electrical resistance will increase when the porous body is used as a battery separator. Therefore, P/B is preferably less than 0.350. When the porous body is used for a separator for lead acid storage batteries, the electrical resistance thereof is preferably 130 mΩ·cm$^2$ or less, and from this viewpoint, P/B is more preferably less than 0.337 or less than 0.300, still more preferably 0.290 or less, still more preferably 0.280 or less, still more preferably 0.270 or less, still more preferably 0.260 or less, still more preferably 0.250 or less, still more preferably 0.230 or less, still more preferably 0.210 or less, still more preferably 0.200 or less, still more preferably 0.190 or less, still more preferably 0.180 or less, or still more preferably 0.170 or less.

Moreover, when the value of P/B is sufficiently high, high mechanical strength can be obtained even if the basis weight of the porous body is reduced, and it is possible to reduce the electrical resistance in dilute sulfuric acid of a separator for lead acid storage batteries by reducing the basis weight. However, even if the relation P/B>0.070 described above is satisfied, it will become difficult to impart the thermal resistance in dilute sulfuric acid, that is an effect of the present invention when the weight of the resin binder solid content in the porous body is not set in an optimum range. On the contrary, even if the weight of the resin binder solid content is designed to be in the optimum range, it will be difficult to impart thermal resistance in dilute sulfuric acid, which is an effect of the present invention when the relation P/B>0.070 is not satisfied. Therefore, in order to impart high thermal resistance in dilute sulfuric acid to a porous body or a battery separator (for example, the separator for lead acid storage batteries), it becomes important to set the amount of the resin binder in an optimum range within the range of P/B>0.070.

The penetration strength of the porous body in the present description (for example, the separator for lead acid storage batteries) according to the BCIS-03B March 2010 standard, is an arithmetic mean value of peak intensities (N) in five regions, which are obtained by penetrating (penetration speed of 120 mm/min.) a porous body fixed by a jig with a cylindrical metal rod (the tip thereof is 1.93 mmΦ/flat) for the five different regions of the porous body. The unit of penetration strength is N.

Moreover, the basis weight of the porous body (for example, a separator for lead acid storage batteries) in the present description is a solid content weight ($g/m^2$) of the porous body per unit area.

<<Density of Porous Body>>

The density D ($g/m^2/mm$) of at least a portion of the porous body according to the present embodiment can be arbitrarily set within the range in which the effect of the present invention is exhibited. When the porous body is used as a battery separator (for example, a separator for lead acid storage batteries), it satisfies preferably D<900, more preferably D<800, still more preferably D<700, still more preferably D<600, still more preferably D<500, or still more preferably D<400, from the viewpoints of increasing porosity, enhancing liquid retainability, or reducing electrical resistance in dilute sulfuric acid. Moreover, by increasing the density of at least a portion of the porous body, the binding area between the melting component of the sheath-core type binder fibers and the peripheral material is increased, the value of P/B corresponding to the membrane strength of the separator membrane formed of the porous body becomes high, and the thermal resistance (shape retainability) in dilute sulfuric acid is enhanced, so that D>10 is preferable, D>50 is more preferable, D>100 is still more preferable, D145 is still more preferable, D>150 is still more preferable, D>200 is still more preferable, or D>250 is still more preferable. When the porous body is used as a battery separator (for example, a separator for lead acid storage batteries), the density of the entire surface or a part of the surface of the separator is preferably within the range of the density D. It is noted that the density of the porous body in the present description is a value obtained by dividing the basis weight by the thickness, and the unit is $g/m^2/mm$. In the present description, the density of the porous body is denoted as D ($g/m^2/mm$).

<<Separator for Lead Acid Storage Batteries and Lead Acid Storage Battery Comprising Same>>

The separator for lead acid storage batteries comprising the porous body according to the present embodiment or consisting of the porous body according to the present embodiment is also an aspect of the present invention. Moreover, the lead acid storage battery comprising the separator for lead acid storage batteries is also another aspect of the present invention. The form of the porous body used as the separator for lead acid storage batteries can be determined to be compatible with each component of the lead acid storage battery. The lead acid storage battery of the present invention contains an electrolytic cell, a lead oxide positive electrode, a lead negative electrode, and dilute sulfuric acid as an electrolytic solution, and is a lead acid storage battery disposing the separator according to the present invention between the positive electrode and the negative electrode. The positive electrode grid constituting the positive electrode may be lead or a lead alloy, and the positive electrode active material may be lead oxide, for example lead dioxide. The negative electrode grid constituting the negative electrode may be lead or a lead alloy, the negative electrode active material may be lead, and the lead negative electrode itself may be, for example, a spongy form. Further, regarding the active materials of the positive electrode and the negative electrode, other metal elements may be contained in the above compositions in an amount of 30% by weight or less. Moreover, the dilute sulfuric acid is sulfuric acid having a specific gravity of 1.1 to 1.4 and may further contain an additive. In the present embodiment, by using a separator having a strong membrane strength for lead acid storage batteries, it is possible to inhibit the separator from being damaged and short-circuited when strong vibration is applied. Therefore, the separator according to one embodiment of the present invention is preferably disposed between the positive electrode and the negative electrode of the lead storage battery. Incidentally, a lead acid storage battery in which the separator for lead acid storage batteries according to one aspect of the present invention is disposed between the positive electrode and the negative electrode in a state of being stacked on another separator, is also included in the lead acid storage battery of the present invention. Further, the lead acid storage battery in which the separator is disposed between the positive electrode and the negative electrode when the separator for lead acid storage batteries according to one aspect of the present invention is stacked with another separator, in a state where these separators are bound therebetween by an organic component such as a resin, etc., is also included in the lead acid storage battery of the present invention. Other separators are not limited to specific ones, but include, for example, (1) an inorganic fiber nonwoven fabric, (2) a separator containing inorganic fibers and inorganic particles, (3) a separator containing inorganic fibers, organic fibers and inorganic particles, (4) a separator containing a resin binder in the above (2) or (3), (5) a polyethylene separator (inorganic particles may be contained therein) having fine pores with an average pore diameter of 800 nm or smaller, etc. The inorganic fibers of (1), (2) and (3) include, for example, glass fibers. Moreover, regarding the separator for lead acid storage batteries in the present embodiment, it may be used not only in the superposition of two layers but also in the multiple layer form of three or more layers. Such a form of three or more layers comprises at least the separator according to the present embodiment as a specific single layer, and the other layers can be selected from arbitrary separators. By comprising the separator for lead acid storage batteries according to the present embodiment between the positive electrode and the negative electrode, a lead acid storage battery provided with the separator that hardly changes the state in an elevated temperature environment (for example, reduction in the weight of the separator or fine pore diameter change due to shape change, etc.), is obtained. The separator for lead acid storage batteries according to the present embodiment can be used in both an open-type lead acid storage battery and a control valve type lead acid storage battery.

EXAMPLES

The present invention will be described in detail based on Examples; however, these are described for the purpose of explanation, and the scope of the present invention is not limited to the following examples.

Tables 1 to 3 show the results on various evaluations of the porous bodies obtained in Examples and Comparative Examples and the separator membranes using the same. Incidentally, each of the compounding ratios (wt %) of the resin binders shown in Tables 1 to 3 is the weight of the resin binder solid content. Evaluation methods for various evaluation items shown in Tables 1 to 3 will be described below.

<<Thickness>>

According to the BCIS-03A Rev December 15 standard, a 2.9 cmΦ plate was set on a separator on the stage, and the membrane thickness under a pressure of 10 kPa was measured with a membrane thickness meter. The thicknesses were measured for five different areas of the separator, and the arithmetic mean value thereof is shown in Tables 1 to 3, respectively. The unit is mm.

<<Basis Weight (Measuring Weight)>>

The separators after heating and drying with a rotary dryer used in Examples and Comparative Examples described below were further dried in air at 90° C. for 30 minutes (removal of adsorbed water), and then the solid content weight contained in the separator was measured for each of Examples and Comparative Examples, and the value obtained by dividing the weight by the area of the separator is shown in Tables 1 to 3, respectively. The unit is $g/m^2$. Moreover, the basis weight is denoted as B ($g/m^2$) in the present description.

<<Density>>

The value obtained by dividing the basis weight described above by the above thickness each is shown in Tables 1 to 3 as the density, respectively. The unit is $g/m^2/mm$. Moreover, the density of the porous body is denoted as D ($g/m^2/mm$) in the present description.

<<Thermal Resistance Test>>

(Swollen Portion Area Ratio)

The separator was cut into a size of 5 cm×5 cm, immersed for 4 hours in diluted sulfuric acid having a specific gravity of 1.28 heated at 80° C., and subsequently immersed in the diluted sulfuric acid at room temperature for 48 hours. The separator was taken out from the dilute sulfuric acid, washed with water and dried at 90° C. for 30 minutes, and the presence or absence of swelling was visually confirmed. The portion where the local swelling occurred in the separator surface was marked, and the area ratio of the marking portion occupied in the entire surface of the separator was described as a swollen portion area ratio (%) in Tables 1 to 3, respectively. In the thermal resistance test, a sample having a swollen portion area ratio of 15% or less was evaluated as one criterion for having thermal resistance in dilute sulfuric acid.

(Weight Retention Ratio)

The separator was cut into a size of 5 cm×5 cm, dried (water removal) at 90° C. for 30 minutes and the weight W1 thereof was measured. Then the separator was immersed for 4 hours in dilute sulfuric acid having a specific gravity of 1.28 heated to 80° C., and subsequently immersed in the diluted sulfuric acid at room temperature for 48 hours. The separator was taken out from the dilute sulfuric acid and washed with water, dried at 90° C. for 30 minutes, the weight W2 was measured again, and the value calculated by (W2/W1)×100 was taken as a weight retention ratio (%) and described in Tables 1 to 3, respectively. In the thermal resistance test, a sample having a weight retention ratio of 96% or more was evaluated as another criterion for having high thermal resistance in dilute sulfuric acid.

It is noted that the separator having high thermal resistance (effect of the present invention) in the present description refers to a separator having a swollen portion area ratio of 15% or less and a weight retention ratio of 96% or more.

<<Penetration Strength>>

According to BCIS-03B March 2010, a cylindrical metal rod (the tip of which is 1.93 mmΦ/flat) was penetrated against the separator fixed with a jig (penetration speed of 120 mm/min), and the peak strength (N) when measured was determined. The peak strengths (N) were measured for five different areas inside the surface of the separator, and the arithmetic mean value of the peak strengths for the five areas are shown in Tables 1 to 3, respectively. Moreover, the penetration strength is denoted as P (N) in the present description.

<<Penetration Strength/Basis Weight>>

The value (P/B) obtained by dividing the above penetration strength by the above basis weight is shown in Tables 1 to 3, respectively. The unit is $N/(g/m^2)$.

<<Electrical Resistance>>

An electrical resistance was measured by an alternating current (AC) four-terminal method (AC 1 kHz, current 1 mA) by using a battery high tester BT3562-01 manufactured by HIOKI E. E. Corporation. Two graphite electrodes (70 mm×90 mm×7 mm) were placed in parallel at an interval of 24 mm in a temperature-controlled (27±1° C.) vessel (made of PP) containing dilute sulfuric acid having a specific gravity of 1.28. Two masks (the mask made of PP plastic plate and having an opening of 20 mm×20 mm in the center) were arranged in the center between the graphite electrodes. Thereafter, a separator cut out to a size of 30 mm×30 mm was placed between the two masks in the center of the opening (the separator was placed so as to clog up the opening), and the resistance value 1 was measured. Next, the resistance value 2 was measured with the separator being removed. The electrical resistance was determined by multiplying the difference between the resistance value 1 and the resistance value 2 by the area of the opening described above. The unit is $mΩ·cm^2$. It is noted that a separator cut into a size of 30 mm×30 mm had been immersed in diluted sulfuric acid having a specific gravity of 1.28 for 24 hours before the electrical resistance measurement and used for the measurement.

Detailed methods of fabricating samples of Examples and Comparative Examples will be described in the following.

Example 1

A slurry was fabricated by dispersing and mixing the following materials in water at the compounding ratios of 10.0% by weight of silica particles having an average particle diameter of 10 μm (P-510 manufactured by Mizusawa Chemical Industry Co., Ltd.) as the particles, 32.6% by weight of glass fibers (average fiber diameter of 0.9 μm, C glass) as the inorganic fibers, 39.2% by weight of sheath-core type binder fibers (average fineness of 2.2 dtex, average fiber length of 5 mm, and the weight ratio of the sheath portion and the core portion of 1:1), consisting of a PET core portion (melting point of 255° C.) and a copolyester sheath portion (melting point of 130° C.) as the sheath-core type binder fibers, 0.0% by weight of polyester fibers (average fineness of 0.8 dtex and average fiber length of 5 mm PET (melting point 255° C.)) as the organic fibers (excluding the sheath-core type binder fibers), and 18.2% by weight (solid content) of an acrylic-based resin binder (solid content concentration of 50 wt % and dispersion medium: water-based and polymer latex) as the resin binder. At this time, 2 parts by weight of the dispersant and 7 parts by weight of the coagulant were added to the slurry and stirred relative to 100 parts by weight of the solid content in the slurry. The product slurry was used to form a sheet on an ordinary papermaking machine, dehydrated and pressed in a wet paper state, and then heated/dried at 180° C. for 3 minutes in a rotary dryer to obtain a porous body. The obtained porous body was used as a separator membrane for lead acid storage batteries and was evaluated for the evaluation items shown in Tables 1 to 3 according to the evaluation methods described above.

Examples 2 to 11, 14, 15, 18, 20 and 23, Comparative Examples 1 to 7 and 12

The materials used, fabrication methods, and evaluation methods are the same as those in Example 1 except that the compounding ratios were changed as described in Tables 1 to 3.

Examples 12 and 13

The materials used, fabrication methods, and evaluation methods are the same as those in Example 1 except that each of the sheath-core type binder fibers was changed to the sheath-core type binder fiber (average fineness: 2.2 dtex, average fiber length: 5 mm, and the weight ratio of the core portion and sheath portion of 1:1), consisting of a PET core portion (melting point of 255° C.) and a copolyester sheath portion (melting point of 110° C.), and the compounding ratios were changed as shown in Table 2.

Examples 16 and 17

The materials used, fabrication methods, and evaluation methods used are the same as those in Example 1 except that each of the sheath-core type binder fibers was changed to the sheath-core type binder fiber (average fineness: 2.2 dtex, average fiber length: 5 mm, and the weight ratio of the core portion and sheath portion of 4:6), consisting of a PET core portion (melting point of 255° C.) and a copolyester sheath portion (melting point of 130° C.), and the compounding ratios were changed as shown in Table 2.

Example 19, Comparative Examples 9 to 11

The materials used, fabrication methods, and evaluation methods are the same as those in Example 1 except that the resin binders were changed to styrene-butadiene-based resin binders (solid content concentration of 50 wt % and dispersion medium: water-based and polymer latex), and the compounding ratios were changed as shown in Table 2 or 3.

Examples 21 and 22

The materials used, fabrication methods, and evaluation methods are the same as those in Example 1 except that the dehydration press pressures of the wet papers each was lowered, and the compounding ratios were changed as shown in Table 2.

Comparative Example 8

The materials used, fabrication method, and evaluation methods are the same as those in Example 1 except that the sheath-core type binder fiber was changed to the sheath-core type binder fiber (average fineness: 2.2 dtex, average fiber length: 5 mm, and the weight ratio of the core portion and sheath portion of 95:5), consisting of a PET core portion (melting point of 255° C.) and a copolyester sheath portion (melting point of 130° C.), and the compounding ratios were changed as shown in Table 3.

The results on the Examples and Comparative Examples shown in Tables 1 to 3 will be explained in the following.

TABLE 1

| | Items | Units | Criteria (numerals in parentheses are those in preferred region) | Examples 1 | 2 | 3 | 4 | 5 |
|---|---|---|---|---|---|---|---|---|
| Com-pound-ing | (1) Particle | wt % | — | 10.0 | 23.0 | 26.0 | 29.4 | 41.0 |
| | (2) Inorganic fiber | wt % | — | 32.6 | 19.6 | 19.6 | 19.6 | 11.0 |
| | (3) Sheath-core type binder fiber | wt % | — | 39.2 | 39.2 | 39.2 | 39.2 | 36.0 |
| | (4) Organic fiber (PET fiber)) | wt % | — | 0.0 | 0.0 | 0.0 | 0.0 | 0.0 |
| | (5) Resin binder (solid content) | wt % | >5.0 and <50 | 18.2 | 18.2 | 15.2 | 11.8 | 12.0 |
| | Sum ((1) + (2) + (3) + (4) + (5)) | wt % | — | 100.0 | 100.0 | 100.0 | 100.0 | 100.0 |
| | Sum ((1) + (2)) | wt % | | 42.6 | 42.6 | 45.6 | 49.0 | 52.0 |
| | Weight ratio: ((1) + (2))/(5) | — | (<7.0) | 2.34 | 2.34 | 3.00 | 4.17 | 4.33 |
| | Melting component of sheath-core type binder fiber, occupied in entire separator | wt % | — | 19.6 | 19.6 | 19.6 | 19.6 | 18.0 |
| Evalu-ation | Thickness | mm | — | 0.40 | 0.37 | 0.38 | 0.37 | 0.36 |
| | Basis weight | g/m² | — | 122 | 120 | 122 | 121 | 120 |
| | Density | g/m²/mm | — | 305 | 324 | 321 | 327 | 333 |
| | Penetration strength | N | — | 20 | 18.2 | 19.1 | 19.7 | 18.0 |
| | Electrical resistance | mΩ · cm² | (≤130) | 73 | 75 | 69 | 56 | 58 |
| | Penetration strength/basis weight | N/(g/m²) | >0.070 | 0.164 | 0.152 | 0.157 | 0.163 | 0.150 |
| | Thermal resistance test (swollen portion area ratio) | % | ≤15 | 0 | 0 | 0 | 0 | 0 |
| | Thermal resistance test (weight retention ratio) | % | ≥96 | 100 | 100 | 100 | 100 | 100 |

TABLE 1-continued

| | Items | | Examples | | | | | |
|---|---|---|---|---|---|---|---|---|
| | | | 6 | 7 | 8 | 9 | 10 | 11 |
| Com-pound-ing | (1) Particle | | 35.7 | 32.4 | 20.1 | 29.4 | 20.0 | 20.1 |
| | (2) Inorganic fiber | | 17.9 | 19.6 | 57.4 | 19.6 | 15.0 | 19.6 |
| | (3) Sheath-core type binder fiber | | 35.7 | 39.2 | 11.3 | 19.6 | 59.0 | 39.2 |
| | (4) Organic fiber (PET fiber)) | | 0.0 | 0.0 | 0.0 | 19.9 | 0.0 | 0.0 |
| | (5) Resin binder (solid content) | | 10.7 | 8.8 | 11.2 | 11.8 | 6.0 | 21.1 |
| | Sum ((1) + (2) + (3) + (4) + (5)) | | 100.0 | 100.0 | 100.0 | 100.0 | 100.0 | 100.0 |
| | Sum ((1) + (2)) | | 53.6 | 52.0 | 77.5 | 49.0 | 35.0 | 39.7 |
| | Weight ratio: ((1) + (2))/(5) | | 5.00 | 5.91 | 6.92 | 4.17 | 5.83 | 1.89 |
| | Melting component of sheath-core type binder fiber, occupied in entire separator | | 17.9 | 19.6 | 5.7 | 9.8 | 29.5 | 19.6 |
| Evalu-ation | Thickness | | 0.40 | 0.39 | 0.40 | 0.38 | 0.38 | 0.38 |
| | Basis weight | | 133 | 124 | 122 | 123 | 121 | 123 |
| | Density | | 333 | 318 | 305 | 324 | 318 | 324 |
| | Penetration strength | | 20.6 | 21.1 | 11.0 | 14.4 | 27.5 | 21.7 |
| | Electrical resistance | | 55 | 54 | 54 | 55 | 53 | 101 |
| | Penetration strength/ basis weight | | 0.155 | 0.170 | 0.090 | 0.117 | 0.227 | 0.176 |
| | Thermal resistance test | (swollen portion area ratio) | 0 | 0 | 11 | 4 | 0 | 0 |
| | Thermal resistance test | (weight retention ratio) | 100 | 99 | 96 | 100 | 99 | 100 |

TABLE 2

| | Items | Units | Criteria (numerals in parentheses are those in preferred region) | Examples | | | | | |
|---|---|---|---|---|---|---|---|---|---|
| | | | | 12 | 13 | 14 | 15 | 16 | 17 |
| Com-pound-ing | (1) Particle | wt % | — | 44.0 | 8.8 | 29.4 | 26.3 | 13.3 | 5.0 |
| | (2) Inorganic fiber | wt % | — | 8.8 | 44.0 | 19.6 | 16.3 | 10.0 | 5.0 |
| | (3) Sheath-core type binder fiber | wt % | — | 35.2 | 35.2 | 43.5 | 26.4 | 66.7 | 80.0 |
| | (4) Organic fiber (PET fiber)) | wt % | — | 0.0 | 0.0 | 0.0 | 0.0 | 0.0 | 0.0 |
| | (5) Resin binder (solid content) | wt % | >5.0 and <50 | 12.0 | 12.0 | 7.5 | 31.0 | 10.0 | 10.0 |
| | Sum ((1) + (2) + (3) + (4) + (5)) | wt % | — | 100.0 | 100.0 | 100.0 | 100.00 | 100.00 | 100.0 |
| | Sum ((1)+(2)) | wt % | — | 52.8 | 52.8 | 49.0 | 42.6 | 23.3 | 10.0 |
| | Weight ratio: ((1) + (2))/(5) | — | (<7.0) | 4.40 | 4.40 | 6.54 | 1.37 | 2.33 | 1.00 |
| | Melting component of sheath-core type binder fiber, occupied in entire separator | wt % | — | 17.6 | 17.6 | 21.8 | 13.2 | 40.0 | 48.0 |
| Evalu-ation | Thickness | mm | — | 0.37 | 0.37 | 0.32 | 0.37 | 0.36 | 0.36 |
| | Basis weight | g/m$^2$ | — | 121 | 123 | 125 | 125 | 124 | 124 |
| | Density | g/m$^2$/mm | — | 327 | 332 | 391 | 338 | 344 | 344 |
| | Penetration strength | N | — | 21.2 | 20.4 | 23.0 | 17.5 | 36.0 | 41.8 |
| | Electrical resistance | mΩ · cm$^2$ | (≤130) | 59 | 59 | 53 | 130 | 125 | 189 |
| | Penetration strength/ basis weight | N/(g/m$^2$) | >0.070 | 0.175 | 0.166 | 0.184 | 0.140 | 0.290 | 0.337 |
| | Thermal resistance test | (swollen portion area ratio) % | ≤15 | 0 | 0 | 0 | 0 | 0 | 0 |
| | Thermal resistance test | (weight retention ratio) % | ≥96 | 98 | 100 | 98 | 100 | 100 | 100 |

TABLE 2-continued

|  | Items | \multicolumn{6}{c|}{Examples} |
| --- | --- | --- | --- | --- | --- | --- | --- |
|  |  | 18 | 19 | 20 | 21 | 22 | 23 |
| Compounding | (1) Particle | 30.0 | 29.4 | 57.4 | 29.4 | 29.4 | 21.0 |
|  | (2) Inorganic fiber | 30.0 | 19.6 | 20.1 | 19.6 | 19.6 | 13.0 |
|  | (3) Sheath-core type binder fiber | 20.0 | 39.2 | 11.3 | 39.2 | 19.6 | 21.0 |
|  | (4) Organic fiber (PET fiber)) | 10.0 | 0.0 | 0.0 | 0.0 | 19.6 | 0.0 |
|  | (5) Resin binder (solid content) | 10.0 | 11.8 | 11.2 | 11.8 | 11.8 | 45.0 |
|  | Sum ((1) + (2) + (3) + (4) + (5)) | 100.0 | 100.0 | 100.00 | 100.0 | 100.00 | 100.0 |
|  | Sum ((1)+(2)) | 60.0 | 49.0 | 77.5 | 49.0 | 49.0 | 34.0 |
|  | Weight ratio: ((1) + (2))/(5) | 6.00 | 4.17 | 6.92 | 4.17 | 4.17 | 0.76 |
|  | Melting component of sheath-core type binder fiber, occupied in entire separator | 10.0 | 19.6 | 5.7 | 19.6 | 9.8 | 10.5 |
| Evaluation | Thickness | 0.37 | 0.37 | 0.38 | 0.80 | 0.78 | 0.36 |
|  | Basis weight | 121 | 121 | 122 | 120 | 123 | 121 |
|  | Density | 327 | 327 | 321 | 150 | 158 | 336 |
|  | Penetration strength | 15.0 | 20.0 | 10.5 | 13.0 | 10.0 | 18.0 |
|  | Electrical resistance | 56 | 55 | 55 | 52 | 53 | 312 |
|  | Penetration strength/ basis weight | 0.124 | 0.165 | 0.086 | 0.108 | 0.081 | 0.149 |
| Thermal resistance test | (swollen portion area ratio) | 4 | 0 | 11 | 8 | 13 | 13 |
| Thermal resistance test | (weight retention ratio) | 98 | 100 | 96 | 98 | 98 | 100 |

TABLE 3

|  | Items | Units | Criteria (numerals in parentheses are those in preferred region) | \multicolumn{6}{c|}{Comparative Examples} |
| --- | --- | --- | --- | --- | --- | --- | --- | --- | --- |
|  |  |  |  | 1 | 2 | 3 | 4 | 5 | 6 |
| Compounding | (1) Particle | wt % | — | 39.2 | 29.4 | 50.0 | 50.0 | 30.0 | 57.4 |
|  | (2) Inorganic fiber | wt % | — | 19.6 | 19.6 | 10.0 | 25.0 | 15.0 | 22.9 |
|  | (3) Sheath-core type binder fiber | wt % | — | 39.2 | 0.0 | 40.0 | 0.0 | 0.0 | 5.0 |
|  | (4) Organic fiber (PET fiber)) | wt % | — | 0.0 | 39.2 | 0.0 | 15.0 | 40.0 | 0.0 |
|  | (5) Resin binder (solid content) | wt % | >5.0 and <50 | 2.0 | 11.8 | 0.0 | 10.0 | 15.0 | 14.7 |
|  | Sum ((1) + (2) + (3) + (4) + (5)) | wt % | — | 100.0 | 100.0 | 100.0 | 100.0 | 100.0 | 100.0 |
|  | Sum ((1) + (2)) | wt % |  | 58.8 | 49.0 | 60.0 | 75.0 | 45.0 | 80.3 |
|  | Weight ratio: ((1)+(2))/(5) | — | (<7.0) | 29.40 | 4.17 | ∞ | 7.50 | 3.00 | 5.46 |
|  | Melting component of sheath-core type binder fiber, occupied in entire separator | wt % | — | 19.6 | 0.0 | 20.0 | 0.0 | 0.0 | 2.5 |
| Evaluation | Thickness | mm | — | 0.38 | 0.39 | 0.38 | 0.38 | 0.38 | 0.38 |
|  | Basis weight | g/m$^2$ | — | 124 | 126 | 120 | 123 | 123 | 124 |
|  | Density | g/m$^2$/mm | — | 326 | 323 | 316 | 324 | 330 | 326 |
|  | Penetration strength | N | — | 20.1 | 7.7 | 21.8 | 7.0 | 8.0 | 8.0 |
|  | Electrical resistance | mΩ · cm$^2$ | (≤130) | 52 | 57 | 51 | 51 | 64 | 65 |
|  | Penetration strength/ basis weight | N/(g/m$^2$) | >0.070 | 0.162 | 0.061 | 0.182 | 0.057 | 0.065 | 0.065 |

TABLE 3-continued

| | | | | | | | | |
|---|---|---|---|---|---|---|---|---|
| Thermal resistance test | (swollen portion area ratio) | % | ≤15 | 0 | 20 | 0 | 24 | 20 | 18 |
| Thermal resistance test | (weight retention ratio) | % | ≥96 | 93 | 90 | 87 | 91 | 90 | 98 |

| | | Comparative Examples | | | | | |
|---|---|---|---|---|---|---|---|
| | Items | 7 | 8 | 9 | 10 | 11 | 12 |
| Com-pound-ing | (1) Particle | 45.0 | 29.4 | 39.2 | 29.4 | 57.4 | 17.2 |
| | (2) Inorganic fiber | 20.0 | 19.6 | 19.6 | 19.6 | 2.9 | 10.6 |
| | (3) Sheath-core type binder fiber | 0.0 | 39.2 | 39.2 | 0.0 | 5.0 | 17.2 |
| | (4) Organic fiber (PET fiber)) | 20.0 | 0.0 | 0.0 | 39.2 | 0.0 | 0.0 |
| | (5) Resin binder (solid content) | 15.0 | 11.8 | 2.0 | 11.8 | 14.7 | 55.0 |
| | Sum ((1) + (2) + (3) + (4) + (5)) | 100.0 | 100.0 | 100.0 | 100.0 | 80.0 | 100.0 |
| | Sum ((1) + (2)) | 65.0 | 49.0 | 58.8 | 49.0 | 60.3 | 27.8 |
| | Weight ratio: ((1)+(2))/(5) | 4.33 | 4.17 | 29.40 | 4.17 | 4.10 | 0.51 |
| | Melting component of sheath-core type binder fiber, occupied in entire separator | 0.0 | 2.0 | 19.6 | 0.0 | 2.5 | 8.6 |
| Evalu-ation | Thickness | 0.86 | 0.37 | 0.38 | 0.37 | 0.38 | 0.37 |
| | Basis weight | 122 | 122 | 124 | 126 | 123 | 121 |
| | Density | 142 | 330 | 326 | 341 | 324 | 327 |
| | Penetration strength | 6.8 | 7.3 | 19.2 | 7.7 | 7.8 | 19.0 |
| | Electrical resistance | 65 | 52 | 51 | 57 | 52 | 392 |
| | Penetration strength/ basis weight | 0.056 | 0.060 | 0.155 | 0.061 | 0.063 | 0.157 |
| Thermal resistance test | (swollen portion area ratio) | 25 | 20 | 0 | 20 | 19 | 17 |
| Thermal resistance test | (weight retention ratio) | 92 | 99 | 93 | 89 | 98 | 100 |

Hereafter, the thermal resistance in dilute sulfuric acid is simply denoted as thermal resistance. The high thermal resistance refers to satisfying both the swollen portion area ratio of 15% or less and the weight retention ratio of 96% or more. A low weight retention ratio refers to the retention of less than 96%, and a high weight retention ratio refers to the retention ratio of 96% or more. Moreover, a high swollen portion area ratio refers to the area ratio of greater than 15%, and a low swollen portion area ratio refers to the area ratio of 15% or less.

Examples 1 to 23 each resulted in exhibiting high thermal resistance by satisfying the condition 1 that P/B>0.070 and the condition 2 that the resin binder solid content was more than 5.0 parts by weight and less than 50 parts by weight with respect to 100 parts by weight of the separator. On the other hand, high thermal resistance was not obtained in Comparative Examples 1 to 12 each which did not satisfy either the condition 1 or the condition 2.

The results shown in Examples 2 to 4, 7, 11, and 19 and Comparative Examples 1 and 9 were each obtained by fixing the compounding ratios of the glass fibers that were inorganic fibers and the sheath-core type binder fibers, and changing the compounding ratio of the resin binder. The separators of Examples 2 to 4, 7, 11 and 19 each in which the weight of the resin binder was more than 5.0 wt % with respect to the entire separator, exhibited high thermal resistance. On the other hand, Comparative Examples 1 and 9 each in which the resin binder was 5.0 wt % or less resulted in exhibiting the low weight retention ratio. Each of Examples 2 to 4, 7, 11, and 19 and Comparative Examples 1 and 9 exhibits the P/B value being higher than 0.070, from which it is found that the weight retention ratio is lowered when the weight ratio of the resin binder is low whereas the membrane strength of the separator is high.

In all the Examples and Comparative Examples except for Comparative Examples 2, 4, 5, 7 and 10 in which the sheath-core type binder fibers were not used, the high weight retention ratio was obtained when the content of the resin binder was greater than 5.0 wt % based on the weight of the entire separator for each of the Examples and Comparative Examples.

All the Examples and Comparative Examples except for Comparative Examples 2, 4, 5, 7 and 10 in which the sheath-core type binder fibers were not used, resulted in satisfying (Wi+Wg)/Mb<7.0 when the weight retention ratios were high. On the other hand, Comparative Examples 1, 3 and 9 wherein (Wi+Wg)/Wb≥7.0, resulted in exhibiting the low weight retention ratios. It is conjectured, because the weight retention ratio can be enhanced since the sheath-core type binder fibers are bound to the peripheral materials by the melting component thereof in the separator containing inorganic particles, inorganic fibers (glass fibers), sheath-core type binder fibers, and resin binder, and therefore the fibers hardly fall off in dilute sulfuric acid at 80° C., whereas because of the inorganic particles and the inorganic fibers (glass fibers) that do not have binding components by themselves, and are instead bound to the separator by the sufficient amount of the resin binder. In consideration thereof, (Wi+Wg)/Wb is preferably less than 7.0. For the same reason, (Wp+Wf)/Wb is preferably less than 7.0.

Examples 15 and 23 and Comparative Example 12 each in which the compounding ratio of the resin binder contained in the separator was changed while the relative weight ratios of the inorganic particles, the glass fibers, and the sheath-core type binder fibers were maintained constant, tended to exhibit the greater swollen portion area ratio as the compounding ratio of the resin binder increased. It is conjectured, because the proportion of the independent pores in the separator increased due to increase in the amount of the resin binder, and the internal pressure rises as the gas existing in the separator thermally expanded when the separator was immersed in dilute sulfuric acid at 80° C., which therefore facilitated to bring about an internal delamination. Since the value of P/B is higher than 0.070 in any of Examples 15 and 23 and Comparative Example 12, and if the compounding ratio of the resin binder is too high, the swollen portion area ratio will be found to become high whereas the membrane strength of the separator is high. Incidentally, the swollen portion area ratios were resulted in low in Examples 15 and 23 in which the compounding ratios of the resin binders were less than 50 wt %, and therefore the resin binder solid content relative to the entire separator is preferably less than 50 wt %. In consideration thereof, the resin binder solid content is preferably greater than 5.0 parts by weight and less than 50 parts by weight relative to 100 parts by weight of the separator, in order to obtain high thermal resistance in the present invention.

From the viewpoint of lowering the proportion of the ratio of the independent pores in the separator (the ratio of the percolated pores is increased in this case.) to reduce a swollen portion area ratio as in Example 23 and Comparative Example 12, it is preferred that $(Wi+Wg)/Wb>0.6$. Moreover, from the viewpoint of setting the electrical resistance to a value of 130 mΩ·cm$^2$ or less as in Example 15, it is preferable that $(Wi+Wg)/Wb≥1.37$.

Comparative Example 2, Comparative Examples 4 to 8 and Comparative Examples 10 and 11 each wherein the resin binder solid content was more than 5.0 parts by weight and less than 50 parts by weight with respect to 100 parts by weight of the separator, shown P/B≤0.070 and resulted in exhibiting the high swollen area ratio. On the other hand, each of Examples 1 to 23 resulted in showing P/B>0.070 and the low swollen portion area ratio. From these results, it may be said that P/B>0.070 is important for decreasing the swollen portion area ratio.

Comparative Examples 1, 3 and 9 using the sheath-core type binder fibers each shows P/B>0.070 and the high membrane strength, however exhibits the low weight retention ratio as the resin binder solid content is 5.0 parts by weight or less with respect to 100 parts by weight of the separator. On the other hand, Comparative Examples 6, 8 and 11 using the sheath-core type binder fibers each in which the resin binder solid content is more than 5.0 parts by weight with respect to 100 parts by weight of the separator, shows P/B≤0.070 and the high swollen portion area ratio. Comparative Example 12 shows P/B>0.070 and exhibits the high membrane strength, however, exhibits the high swollen portion area ratio because of the resin binder solid content of 50 parts by weight or more relative to 100 parts by weight of the separator. From these results, the separator according to one aspect of the present invention is found to exhibit the high thermal resistance by containing inorganic particles, inorganic fibers (glass fibers), sheath-core type binder fibers, and resin binder, and satisfying P/B>0.070 and the resin binder solid content of greater than 5.0 parts by weight and less than 50 parts by weight with respect to 100 parts by weight of the separator.

Moreover, regarding Comparative Examples 2, 4, 5, 7 and 10, the results of using only PET fibers as the organic fibers without using the sheath-core type binder fibers, were obtained. The Comparative Examples each in which the amount of resin binder in the entire separator was more than 5.0 wt %, resulted in exhibiting the low weight retention ratio. In the case of using the sheath-core type binder fibers, the fiber itself has a function of binding to a peripheral material by the melting component of the fiber, whereas the PET fiber does not have a melting component and is instead bound to the peripheral material by the resin binder. Comparative Examples 2, 4, 5, 7 and 10 each is conjectured to exhibit the low weight retention ratio because the PET fibers were not bound to the separator by the melting component of the sheath-core type binder fibers and were detached from the separator in the thermal resistance (weight retention ratio) test. Moreover, these Comparative Examples each resulted in exhibiting the high swollen portion area ratio due to absence of binding by the sheath of the sheath-core type binder fiber, from which the sheath-core type binder fiber is found to play an important role from the viewpoint of improving thermal resistance.

Further, Examples 1 to 23 and Comparative Examples 1, 3, 9, and 12 each in which the amount of the melting component of the sheath-core type binder fibers in the total weight of the separator was 5.0 wt % or more and 50 wt % or less, resulted in satisfying P/B>0.070. On the other hand, Comparative Example 2, Comparative Examples 4 to 8 and Comparative Examples 10 and 11 each in which the amount of the melting component of the sheath-core type binder fibers in the total weight of the separator was less than 5.0 wt %, resulted in satisfying P/B0.070 and exhibiting the high swollen portion area ratio. Therefore, the amount of the melting component of the sheath-core type binder fibers occupied in the weight of the entire separator is preferably 5.0 wt % or more, from the viewpoint of reducing the swollen portion area ratio. It is conjectured, because the sheath-core type binder fibers in the separator bound with each other in the three-dimensional network structure formed therein, and the fibers and the other materials were firmly bound due to an increase in the melting component of the sheath-core type binder fibers in the separator, which therefore increased the P/B value representing a membrane strength and inhibited the swelling in dilute sulfuric acid at 80° C.

The influence of the difference in the density of the separators having a density region of 145 g/m$^2$/mm or more was confirmed in comparison of Example 4 and Example 21 and of Example 9 and Example 22. All of them satisfy P/B>0.070, and the higher the density is, the higher the value of P/B tends to be. It is assumed that by increasing the density of the separator, the binding area between various types of materials increased due to the melting component of the sheath-core type binder fibers, and therefore the membrane strength of the separator increased, and the thermal resistance in dilute sulfuric acid (shape retainability) was enhanced. Further, it is conjectured that by increasing the density of the separator, the binding surface property between the resin binder and other materials (in particular, inorganic particles, glass fibers) has also been increased, from which the weight retainability in dilute sulfuric acid would be increased.

Moreover, from the viewpoint of adjusting the electrical resistance of the separator to a value of 130 mΩ·cm$^2$ or less as in Example 16, the melting component amount of the sheath-core type binder fibers in the weight of the entire separator is preferably 40 wt % or less.

Further, Example 4 and Comparative Example 8 have different weight ratios of the sheath components and the core components of the sheath-core type binder fibers. From these results, it may be said that the P/B value does not correlate with the compounding ratio of the sheath-core type binder fibers occupied in the separator in comparison of the evaluation results of a plurality of separators having the same density, and it has a high correlation with the weight of the melting component of the sheath-core type binder fibers.

Example 4 and Example 19, Comparative Example 1 and Comparative Example 9, Comparative Example 2 and Comparative Example 10, and Comparative Example 6 and Comparative Example 11 show the results in comparison of the case of using an acrylic-based resin binder as the resin binder and the case of using a styrene-butadiene-based resin binder, however, regarding the thermal resistance, a similar result was obtained regardless of which resin binder was used.

Examples 9, 18 and 22 each in which both the sheath-core type binder fibers and the polyethylene terephthalate fibers were used, exhibited high thermal resistance by satisfying the condition 1 of P/B>0.070 and the condition 2 that the resin binder solid content was more than 5.0 parts by weight and less than 50 parts by weight relative to 100 parts by weight of the separator.

Examples 12 and 13 each in which the sheath-core type binder fibers consisting of a PET core portion and a copolymerized polyester sheath portion (melting point 110° C.) were used in the separator, exhibited the high thermal resistance by satisfying the condition 1 of P/B>0.070 and the condition 2 that the resin binder solid content was more than 5.0 parts by weight and less than 50 parts by weight with respect to 100 parts by weight of the separator.

Comparing Examples 2 to 4, 7, 11, and 19 and Comparative Examples 1 and 9, it has been confirmed that the electrical resistance tended to increase as the weight ratio of the resin binder solid content to the total weight of the separator increased. From the viewpoint of electrical resistance, the amount of the resin binder is preferably as little as possible. Further, from the viewpoint of adjusting the electrical resistance to a value of 130 mΩ·cm² or less as in Example 15, the amount of the resin binder solid content occupied in the total weight of the separator is preferably 31 wt % or less.

From all of the above, it is found that a porous body or separator exhibiting high thermal resistance in dilute sulfuric acid can be obtained when the porous body containing the sheath-core type binder fibers and the resin binder, contains a resin binder solid content in an amount of more than 5.0 parts by weight and less than 50 parts by weight with respect to 100 parts by weight of the porous body, and satisfies P/B>0.070 wherein the penetration strength of the porous body is P (N) and the basis weight is B(g/m²).

INDUSTRIAL APPLICABILITY

The porous body according to the present invention can be used as a material required to have thermal resistance, for example, a separator for separating a plurality of fixtures, a separator for lead acid storage batteries, a filter, etc.

The invention claimed is:

1. A lead acid storage battery comprising a porous body as a separator for lead acid storage batteries, the porous body containing sheath-core type binder fibers and a resin binder,
   wherein a resin binder solid content is contained in an amount of more than 5.0 parts by weight and less than 50 parts by weight relative to 100 parts by weight of the porous body, and when P (N) is a penetration strength of the porous body and B (g/m²) is a basis weight of the porous body, P and B satisfy P/B>0.070,
   wherein the resin binder is at least one selected from the group consisting of an acrylic-based binder and a styrene-based resin binder,
   wherein the porous body contains inorganic fibers and inorganic particles,
   wherein the porous body contains a network structure formed by the inorganic fibers,
   wherein the inorganic fibers and inorganic particles are bound by a melting component of the resin binder or sheath-core type binder fibers,
   wherein a core material of the sheath-core type binder fibers is at least one selected from polyethylene terephthalate (PET), poly-1,3-trimethylene terephthalate (PTT), and polybutylene terephthalate (PBT),
   wherein a sheath material of the sheath-core type binder fibers is polyester,
   wherein the porous body contains glass fibers, and when a weight of the inorganic particles contained in the porous body is Wi (g), a weight of the glass fibers is Wg (g), and a weight of the resin binder solid content is Wb (g), Wi, Wg, and Wb satisfy 1.0≤(Wi+Wg)/Wb≤4.5,
   wherein a content of the sheath-core type binder fibers with respect to 100 parts by weight of the porous body is 35 parts by weight to 45 parts by weight, and
   wherein a melting component of the sheath-core type binder fibers is contained in an amount of 17 parts by weight or more and 25 parts by weight or less, relative to 100 parts by weight of the separator.

2. The lead acid storage battery according to claim 1, wherein the melting component has a melting point of lower than 200° C.

3. The lead acid storage battery according to claim 1, wherein the melting component of the sheath-core type binder fiber is polyester having a melting point of lower than 200° C.

4. The lead acid storage battery according to claim 1, wherein a weight ratio of a sheath component to a core component of the sheath-core type binder fiber (a weight of the sheath component (g)/a weight of the core component (g)) is 0.15 or more and 50 or less.

5. The lead acid storage battery according to claim 1, wherein a weight ratio of a sheath component to a core component of the sheath-core type binder fiber (a weight of the sheath component (g)/a weight of the core component (g)) is 0.60 or more and 1.6 or less.

6. The lead acid storage battery according to claim 1, wherein the P/B satisfies P/B<0.350.

7. The lead acid storage battery according to claim 1, wherein a density of at least one portion of the porous body is 145 g/m²/mm or more.

8. The lead acid storage battery according to claim 1, wherein the porous body contains particles and the particles are silica particles.

9. The lead acid storage battery according to claim 1, wherein a non-melting component of the sheath-core type binder fiber is polyester having a melting point of 200° C. or higher.

10. The lead acid storage battery according to claim 1, wherein the porous body contains organic fibers having a melting point of 200° C. or higher, excluding the sheath-core type binder fibers.

11. The lead acid storage battery according to claim 1, wherein the porous body contains inorganic fibers, and the inorganic fibers are contained in an amount of 3 parts by weight to 70 parts by weight relative to 100 parts by weight of the porous body.

12. The lead acid storage battery according to claim 1, wherein the porous body is a wet papermaking porous body.

13. The lead acid storage battery according to claim 1, containing an electrolytic cell, a lead oxide positive electrode, a lead negative electrode, and dilute sulfuric acid, wherein the porous body is disposed between the lead oxide positive electrode and the lead negative electrode.

14. The lead acid storage battery according to claim 4, containing an electrolytic cell, a lead oxide positive electrode, a lead negative electrode, and dilute sulfuric acid, wherein the porous body is disposed between the lead oxide positive electrode and the lead negative electrode.

15. The lead acid storage battery according to claim 1, wherein a solid content of the resin binder is greater than 10 parts by weight relative to 100 parts by weight of the porous body.

16. The lead acid storage battery according to claim 1, wherein the resin binder distributes evenly in the porous body.

* * * * *